(12) United States Patent
Iyasu et al.

(10) Patent No.: US 9,184,674 B2
(45) Date of Patent: Nov. 10, 2015

(54) POWER CONVERSION APPARATUS THAT PROVIDES POWER CONVERSION BETWEEN AC AND DC POWER

(71) Applicant: DENSO CORPORATION, Kariya, Aichi-pref. (JP)

(72) Inventors: Seiji Iyasu, Anjo (JP); Shinji Ando, Nukata-gun (JP); Sadahisa Onimaru, Chiryu (JP); Kazuyoshi Obayashi, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 144 days.

(21) Appl. No.: 13/886,953

(22) Filed: May 3, 2013

(65) Prior Publication Data
US 2013/0301323 A1 Nov. 14, 2013

(30) Foreign Application Priority Data

May 10, 2012 (JP) .................................. 2012-108803
Jan. 11, 2013 (JP) ..................................... 2013-3829

(51) Int. Cl.
| | |
|---|---|
| H02M 5/42 | (2006.01) |
| H02M 7/04 | (2006.01) |
| H02M 7/68 | (2006.01) |
| H02M 7/797 | (2006.01) |
| H02M 1/42 | (2007.01) |
| H02M 1/00 | (2007.01) |

(52) U.S. Cl.
CPC ............ *H02M 7/797* (2013.01); *H02M 1/4233* (2013.01); *H02M 1/4258* (2013.01); *H02M 2001/007* (2013.01); *Y02B 70/126* (2013.01)

(58) Field of Classification Search
CPC ... H02M 1/42; H02M 1/4208; H02M 1/4233; H02M 1/4258; H02M 7/217; H02M 7/219; H02M 7/537; H02M 7/5387; H02M 7/53873; H02M 7/53871

USPC ........ 363/15–17, 74, 78, 84, 88, 89, 124–127
See application file for complete search history.

(56) References Cited

U.S. PATENT DOCUMENTS

| | | | |
|---|---|---|---|
| 2004/0165403 A1* | 8/2004 | Crawford | 363/17 |
| 2004/0239299 A1* | 12/2004 | Vinciarelli | 323/282 |
| 2008/0018265 A1* | 1/2008 | Lee et al. | 315/291 |

(Continued)

FOREIGN PATENT DOCUMENTS

JP 2004-135372 4/2004

OTHER PUBLICATIONS

Office Action (4 pages) dated Oct. 21, 2014, issued in corresponding Japanese Application No. 2013-003829 and English translation (7 pages).

*Primary Examiner* — Jeffrey Gblende
(74) *Attorney, Agent, or Firm* — Nixon & Vanderhye P.C.

(57) ABSTRACT

A power conversion apparatus includes: a bridge circuit between AC and DC ends; a converter circuit between the bridge circuit and the DC end; and a control device for the converter circuit. The converter circuit includes: first and second switches in series between terminals of the bridge circuit; third and fourth switches in series between terminals of the DC end; and a reactor between an intermediate point of the first and second switches and an intermediate point of the third and fourth switches. The control device includes: a first controller defining a part of a cycle of an AC voltage as a stop period and stopping switching the first and second switches during the stop period; and a second controller performing voltage/power factor correction controls over an entire cycle by switching the third and/or fourth switches.

18 Claims, 19 Drawing Sheets

(56) References Cited

U.S. PATENT DOCUMENTS

| | | |
|---|---|---|
| 2009/0051346 A1* | 2/2009 | Manabe et al. ............... 323/363 |
| 2010/0026218 A1 | 2/2010 | Ogino et al. |
| 2011/0188269 A1* | 8/2011 | Hosotani ................... 363/21.06 |
| 2012/0014152 A1* | 1/2012 | Nakamura et al. ............ 363/126 |
| 2012/0268084 A1* | 10/2012 | Wang et al. .................. 323/208 |

* cited by examiner

US 9,184,674 B2

POWER CONVERSION APPARATUS THAT PROVIDES POWER CONVERSION BETWEEN AC AND DC POWER

CROSS REFERENCE TO RELATED APPLICATIONS

This application is based on Japanese Patent Applications No. 2012-108803 filed on May 10, 2012, and No. 2013-3829 filed on Jan. 11, 2013, the disclosures of which are incorporated herein by reference.

TECHNICAL FIELD

The present disclosure relates to a power conversion apparatus that provides power conversion between AC power and DC power.

BACKGROUND

Patent Document 1 discloses a power conversion apparatus capable of performing step-up and -down operations. This power conversion apparatus makes four switch elements continuously perform switching operations in order to suppress a spike occurring at the switching between step-up and step-down operations. More specifically, two switch elements Q1 and Q2 provided on the side of an AC end perform a step-down operation by switching at a constant duty.

The configuration in the related art has a large switching loss because the switch elements continuously perform switching operations. In particular, the two switch elements Q1 and Q2 provided on the side of the AC end have a large switching loss.

When viewed from a different viewpoint, an input current from the AC end is interrupted by the switching operations of the two switch elements Q1 and Q2 provided on the side of the AC end. A reactor current flowing to a reactor is therefore large. As a result, a reactor loss is increased due to the large reactor current. Further, a conduction loss and a switching loss of the switching elements are further increased due to the large reactor current.

Patent Document 1: Japanese Patent No. 3825386 (JP-A-2004-135372)

SUMMARY

It is an object of the present disclosure to provide a power conversion apparatus that suppresses losses arising from switching operations of switching elements.

According to an example aspect of the present disclosure, a power conversion apparatus includes: a bridge circuit disposed between an AC end, to which an AC power supply is connected, and a DC end, to which a DC power supply is connected; a converter circuit disposed between the bridge circuit and the DC end; and a control device that controls the converter circuit. The converter circuit includes: a first switch element and a second switch element arranged in series between terminals of the bridge circuit; a third switch element and a fourth switch element arranged in series between terminals of the DC end; and a reactor arranged between an intermediate point of the first and second switch elements and an intermediate point of the third and fourth switch elements. The control device includes: a first control portion that defines a part of a cycle of an AC voltage across the AC end as a stop period and stops switching between the first switch element and the second switch element during the stop period; and a second control portion that performs voltage control and power factor correction control over an entire cycle of the AC voltage by switching at least one of the third switch element and the fourth switch element.

According to the configuration above, the first control portion stops switching of the first switch element and the second switch element during the stop period. Hence, losses arising from the switching of the first switch element and the second switch element can be suppressed.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
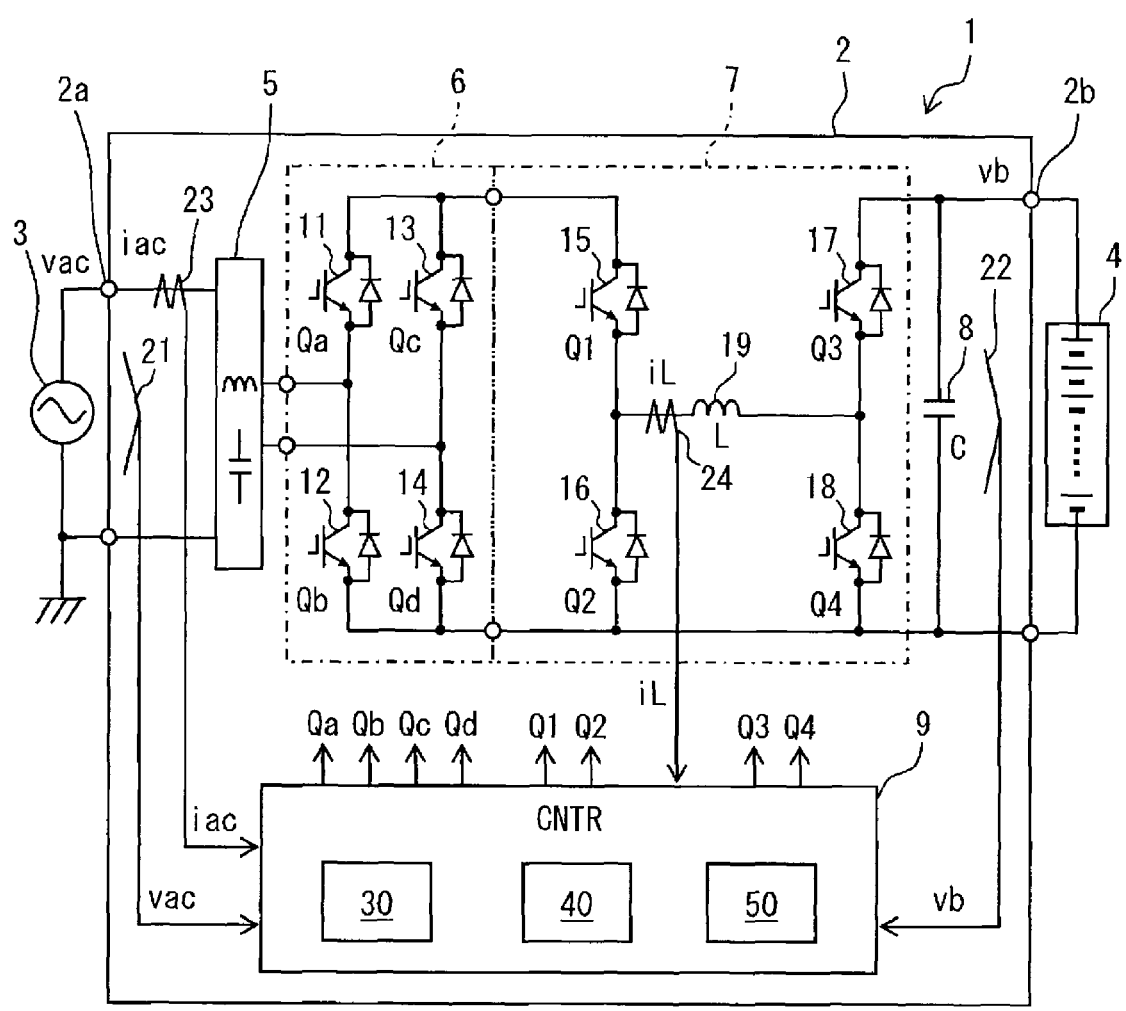
FIG. 1 is a block diagram showing a power conversion apparatus according to a first embodiment.

Hereinafter, a plurality of embodiments will be described with reference to the drawings. In the respective embodiments, a description may not be repeated for portions corresponding to matters described in the preceding embodiment(s) by labeling such portions with the same reference numerals. In a case where only a part of the configuration is described in the respective embodiments, the other embodiment(s) previously described is applicable to the rest of the configuration. For portions in the subsequent embodiment(s) that correspond to the matters described in the preceding embodiment(s), a correspondence is indicated by labeling such portions with reference numerals different only in the hundreds place and a description may not be repeated. Besides portions for which specific combinations are explicitly described in the respective embodiments, the embodiments may be combined partially even when not described explicitly unless a problem occurs in such combinations.

First Embodiment

Referring to FIG. 1, a first embodiment is a charge circuit 1. The charge circuit 1 includes a power conversion apparatus 2. The charge circuit 1 includes an AC power supply 3 that supplies AC power. The charge circuit 1 includes a DC power supply 4.

The power conversion apparatus 2 includes an AC end 2a to which the AC power supply 3 is connected and a DC end 2b to which the DC power supply 4 is connected. The power conversion apparatus 2 is capable of converting power of the AC power supply 3 to DC power. Also, the power conversion apparatus 2 is capable of converting power of the DC power supply 4 to AC power. The charge circuit 1 forms a power supply circuit that supplies the DC power supply 4 with power as a load.

The AC power supply 3 is a large-scale power network, for example, a commercial power supply, or a small-scale power network in a business place or a household, for example, a private power grid. The AC power supply 3 can include a power generator.

The DC power supply 4 is provided by a secondary battery charged with DC power supplied from the power conversion apparatus 2. The secondary battery is an in-vehicle secondary battery incorporated into a vehicle, a portable secondary battery, or a stationary secondary battery fixed on the ground. The secondary battery is provided, for example, by a lithium ion battery.

The power conversion apparatus 2 includes a filter circuit 5, a bridge circuit 6, and a step-up and -down converter circuit 7, a DC smoothing capacitor 8, and a control device (CNTR) 9. The filter circuit 5 eliminates a high-frequency noise.

The bridge circuit 6 is disposed between the AC power supply 3 and the DC power supply 4. The bridge circuit 6 is a full bridge circuit having a plurality of switch elements 11 through 14. The bridge circuit 6 provides AC-to-DC conversion from AC to DC and DC-to-AC conversion from DC to AC. For example, the bridge circuit 6 outputs a full-wave rectified voltage by rectifying AC power. The bridge circuit 6 may also be called a two-way rectifier circuit.

The bridge circuit 6 includes a first switch element 11 (hereinafter, referred to as Qa), a second switch element 12 (hereinafter, referred to as Qb), a third switch element 13 (hereinafter, referred to as Qc), and a fourth switch element 14 (hereinafter, referred to Qd) in respective arms of the bridge circuit 6. A pair of AC ends is formed between Qa and Qb and Qc and Qd. A pair of DC ends is formed between Qa and Qc and between Qb and Qd.

The converter circuit 7 is disposed between the bridge circuit 6 and the DC power supply 4. The converter circuit 7 is an H-bridge converter circuit having a plurality of switch elements 15 through 18 and a reactor 19. The converter circuit 7 is capable of converting a voltage in two ways by step-up and down conversion.

The converter circuit 7 includes a first switch element 15 (hereinafter, referred to as Q1) and a second switch element 16 (hereinafter, referred to as Q2) connected in series and disposed on a side of the AC power supply 3. Q1 and Q2 are connected in series in a forward direction with respect to a voltage supplied from the bridge circuit 6. Q1 and Q2 are arrayed in series between terminals of the bridge circuit 6. Further, the converter circuit 7 includes a third switch element 17 (hereinafter, referred to as Q3) and a fourth switch element 18 (hereinafter, referred to as Q4) connected in series and disposed on a side of the DC power supply 4. Q3 and Q4 are connected in series in a forward direction with respect to a voltage across the DC power supply 4. Q3 and Q4 are arrayed in series between terminals of the DC end 2b.

The reactor (L) 19 is provided between Q1 and Q2 and between Q3 and Q4. The reactor 19 is an inductance element functioning as an energy accumulation element. The reactor 19 is provided between an intermediate point of the Q1 and Q2 and an intermediate point of Q3 and Q4. Further, the capacitor 8 is provided so as to be parallel to Q3 and Q4. The capacitor 8 is a smoothing output capacitor.

The converter circuit 7 can be also called a step-up and -down chopper circuit. The converter circuit 7 includes a component as a step-up converter circuit and a component as a step-down converter circuit. When power is supplied from the AC power supply 3 to the DC power supply 4, Q4 provides a switch element of the step-up converter circuit. When power is supplied from AC power supply 3 to the DC power supply 4, Q1 provides a switch element of the step-down converter circuit. When power is supplied from the DC power supply 4 to the AC power supply 3, Q2 provides a switch element of the step-up converter circuit. When power is supplied from the DC power supply 4 to the AC power supply 3, Q3 provides a switch element of the step-down converter circuit.

The switch elements 11 through 18 are IGBT elements (Insulated Gate Bipolar Transistor elements). Hence, the switch elements 11 through 18 are formed as parallel circuits of switching transistors and reverse-connected diodes.

The control device 9 controls a plurality of the switch elements 11 through 18 of the bridge circuit 6 and the converter circuit 7. The control device 9 provides control means for controlling the bridge circuit 6 and the converter circuit 7. The control device 9 is provided by a micro-computer including a computer-readable memory medium. The memory medium stores a computer-readable program therein in a non-temporary manner. The memory medium can be provided by a semiconductor memory or a magnetic disk. When run on the control device 9, the program makes the control device 9 function as a device described herein and makes the control device 9 function so as to perform a control method described herein. Means provided by the control device 9 can be also called a functional block or a module achieving a predetermined function.

The power conversion apparatus 2 includes a voltage detector 21 as an AC voltage detection portion that detects an AC voltage vac. The power conversion apparatus 2 includes another voltage detector 22 as a DC voltage detection portion that detects a DC voltage vb. The power conversion apparatus 2 includes a current detector 23 as an AC current detection portion that detects an AC current iac. The power conversion apparatus 2 includes another current detector 24 as a reactor current detection portion that detects a reactor current iL flowing to the reactor 19. An input voltage between the bridge circuit 6 and the converter circuit 7 is found as an absolute value vac of the AC voltage vac. The input voltage may be detected instead of detecting the AC voltage vac. Further, an output voltage of the bridge circuit 6 may be detected instead of detecting |vac| from the AC voltage vac. Detection signals from a plurality of these detectors 21, 22, 23, and 24 are inputted into the control device 9.

The control device 9 controls a plurality of the switch elements 11 through 18 so as to provide a forward mode in which power is supplied from the AC power supply 3 to the DC power supply 4. The forward mode can be also called a charge mode in which the DC power supply 4 is charged with AC power supplied from the AC power supply 3.

In the forward mode, the control device 9 controls Qa through Qd so that conversion from AC to DC is performed by the bridge circuit 6. To be more concrete, the control device 9 makes the bridge circuit 6 function as a diode rectifier circuit. The control device 9 controls Qa through Qd to be fixedly in an OFF state.

In the forward mode, the control device 9 provides step-down control by controlling at least Q1 to switch, that is, to switch ON and OFF. In this instance, Q1 and Q2 can be driven inversely to each other. In the forward mode, the control device 9 provides step-up control by controlling at least Q4 to switch. In this instance, Q3 and Q4 can be driven inversely to each other.

Further, the control device 9 performs power factor correction control (PFC control) by which the AC voltage vac and the AC current iac are brought substantially in phase. A target current iac* of the AC current iac can be generated on the basis of the AC voltage vac. Also, a phase of the AC current iac can be controlled by controlling a current flowing to the reactor 19. Hence, the control device 9 controls at least one switch element of the converter circuit 7 so that the reactor current iL coincides with a target value iL*. In the example shown in the drawing, the control device 9 controls Q3 and Q4 so as to perform the power factor correction control. The target value iL* of the reactor current iL can be generated from the target current iac* of the input current iac.

The control device 9 controls a plurality of the switch elements 11 through 18 so as to provide a reverse mode in which power is supplied from the DC power supply 4 to the AC power supply 3. The reverse mode can be also called a reverse power mode.

In the reverse mode, the control device 9 provides step-down control by controlling at least Q3 to switch, that is, to switch ON and OFF. In this instance, Q3 and Q4 can be driven inversely to each other. In the reverse mode, the control device 9 provides step-up control by controlling at least Q2 to switch. In this instance, Q1 and Q2 can be driven inversely to each other.

In the reverse mode, the control device 9 makes the bridge circuit 6 function as an inverter circuit. The control device 9 controls Qa through Qd so that conversion from DC to AC is performed by the bridge circuit 6. To be more concrete, the control device 9 controls a pair of Qa and Qd and a pair of Qb and Qc to switch according to a polarity of the AC voltage vac. A pair of Qa and Qd and a pair of Qb and Qc are driven inversely. As a result, Qa through Qd are controlled to switch at a frequency of the AC voltage vac.

Further, the control device 9 performs the power factor correction control (PFC control) by which the AC voltage vac and the AC current iac are brought substantially in phase. In the example shown in the drawing, the control device 9 controls Q3 and Q4 so as to perform the power factor correction control.

In a case where a switch element on a high side and a switch element on a low side are driven inversely, a dead time is given.

Figure 2:
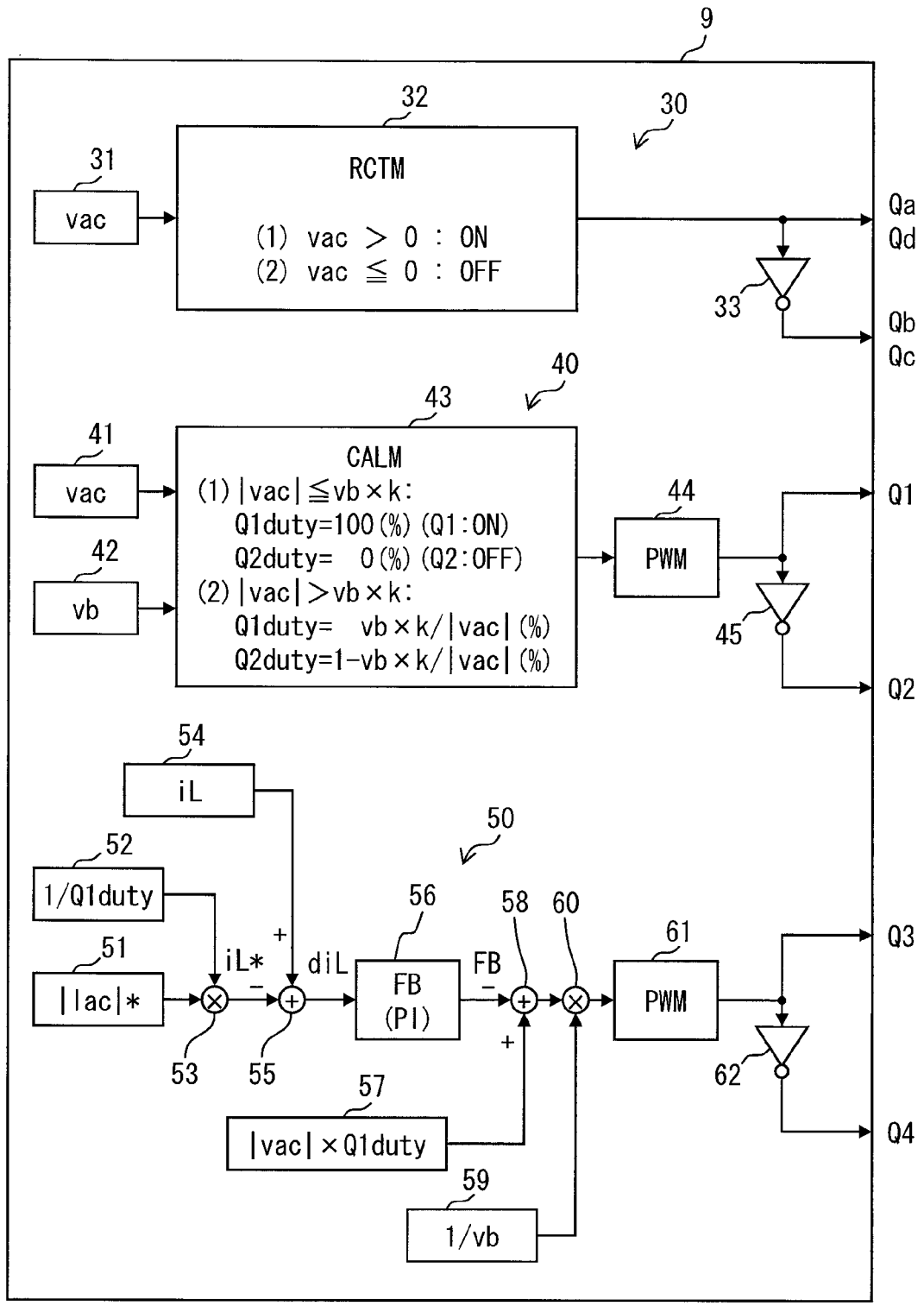
FIG. 2 is a block diagram showing a control device of the first embodiment.

FIG. 2 shows functional blocks provided by the control device 9. The control device 9 includes a rectifier portion 30 used to control the bridge circuit 6. The rectifier portion 30 includes an input portion 31, a rectification control portion (RCTM) 32, and an inverter 33. The input portion 31 inputs the AC voltage vac. The rectification control portion 32 outputs an ON signal when vac>0. The rectification control portion 32 outputs an OFF signal when vac≤0. An output of the rectification control portion 32 is supplied to one pair of diagonally disposed switch elements, that is, Qa and Qd. The inverter 33 inverts an output of the rectification control portion 32. An output of the inverter 33 is supplied to the other pair of diagonally disposed switch elements, that is, Qb and Qc.

The rectifier portion 30 drives Qa and Qd to be in an ON state when vac>0, that is, when the AC voltage vac is positive. The rectifier portion 30 drives Qa and Qd to be in an OFF state when vac≤0, that is, when the AC voltage vac is negative or 0.

The control device 9 includes a first control portion 40 used to control Q1 and Q2. In the example shown in the drawing, the first control portion 40 provides a step-down control portion for the forward mode and a step-up control portion for the reverse mode. A drive signal of Q1 has a duty ratio Q1duty. A drive signal of Q2 has a duty ratio Q2duty.

The first control portion 40 includes a plurality of functional blocks 41 through 45. An input portion 41 inputs the AC voltage vac. An input portion 42 inputs the DC voltage vb. A calculation portion (CALM) 43 determines a ratio of an ON time to an OFF time, that is, duty ratios of Q1 and Q2.

The calculation portion 43 compares the absolute value |vac| of the AC voltage vac with a predetermined threshold voltage vb×k slightly lower than the DC voltage vb. The threshold voltage vb×k is the product of the DC voltage vb and a coefficient k. The coefficient k is less than 1.

Figure 3:
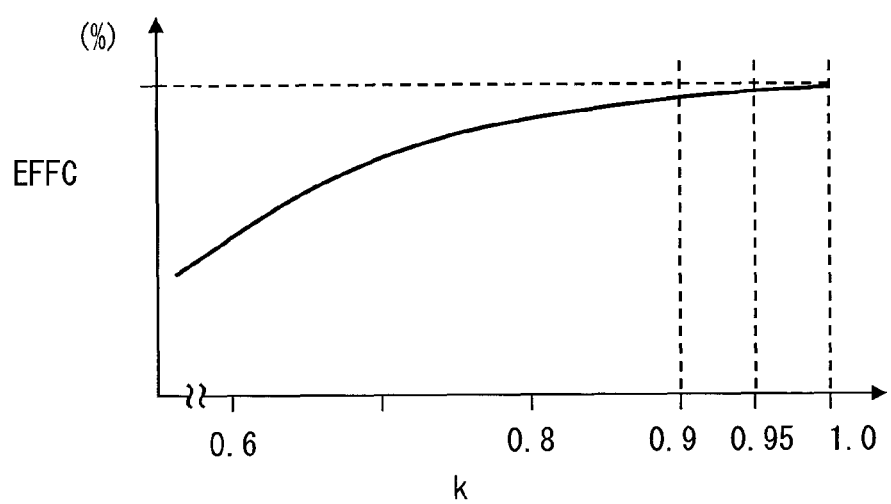
FIG. 3 is a graph showing a relation between a coefficient and conversion efficiency of the first embodiment.

As is shown in FIG. 3, conversion efficiency EFFC of the power conversion apparatus 2 reaches a maximum value when the coefficient k is 1. The conversion efficiency EFFC decreases as the coefficient k decreases. When the coefficient k drops below 0.8, the conversion efficiency EFFC drops abruptly. Also, when the coefficient k drops below 0.9, a drop amount of the conversion efficiency EFFC is by no means a negligible drop amount for the power conversion apparatus 2. On the other hand, when the coefficient k is set to 1.0, |vac|=|vb| is obtained in some cases. In this case, the duty ratio often becomes over-modulated. In this case, distortions may possibly occur in the waveform because the reactor current iL cannot be controlled to have a command value. It is therefore preferable to set the coefficient k to be below 1.0. Hence, the coefficient k can be set to a range of 0.8 inclusive to 1.0 exclusive. It is preferable to set the coefficient k to a range of 0.9 inclusive to 1.0 exclusive. Further, it is more preferable to set the coefficient k to a range of 0.95 inclusive to 1.0 exclusive. Distortions can be suppressed by suppressing a drop of the conversion efficiency.

Referring to FIG. 2 again, the calculation portion 43 sets Q1duty to 100% and Q2duty to 0% when |vac|≤vb×k. On the basis of a comparison between the absolute value |vac| and the threshold voltage vb×k by the calculation portion 43, the control device 9 defines a predetermined period within a cycle of the AC voltage vac as a stop period TDS1 during which switching is stopped. The stop period TDS1 is therefore in synchronous with the AC voltage vac. The control device 9 stops switching of Q1 and Q2 during the stop period TDS1. The calculation portion 43 sets Q1duty to (vb×k/|vac|) % and Q2duty to $(1-vb\times k/|vac|)$ % when $|vac|>vb\times k$. On the basis of a comparison between the absolute value $|vac|$ and the threshold voltage $vb\times k$ by the calculation portion 43, the control device 9 defines a predetermined period within a cycle of the AC voltage vac as a switching period TSW1 during which switching is performed. The switching period TSW1 is therefore in synchronous with the AC voltage vac.

A pulse width modulation portion (PWM) 44 outputs a pulse signal having a duty ratio specified by the calculation portion 43. The pulse signal is used as a drive signal of Q1. An inverter 45 outputs a drive signal of Q2 by inverting the drive signal of Q1.

As a result, the control device 9 directly connects the bridge circuit 6 and the converter circuit 7 when $|vac|\leq vb\times k$ by closing Q1 and opening Q2. When $|vac|>vb\times k$, the control device 9 performs switching of Q1 and Q2 at a ratio corresponding to a ratio of the absolute value $|vac|$ to the DC voltage vb. In other words, Q1 and Q2 are controlled so as to perform the step-down control in the forward mode and controlled so as to perform step-up control in the reverse mode.

The first control portion 40 defines a part of the cycle of the AC voltage vac across the AC end 2a as the stop period TDS1. The first control portion 40 stops the switching of Q1 and Q2 during the stop period TDS1. The first control portion 40 defines a period during which the AC voltage vac is below the threshold voltage $vb\times k$ set using the DC voltage vb across the DC end 2b and the coefficient k less than 1 ($|vac|\leq vb\times k$) as the stop period TDS1. In other words, the first control portion 40 sets the stop period TDS1 in a period during which the AC voltage vac is below the threshold voltage $vb\times k$. The first control portion 40 defines a period during which the AC voltage vac is above the threshold voltage $vb\times k$ ($|vac|>vb\times k$) as the switching period TSW1. The first control portion 40 performs switching of at least one of Q1 and Q2 during the switching period TSW1. According to this configuration, in a period during which the AC voltage vac is below the threshold voltage $vb\times k$, that is, in a period during which $|vac|\leq vb\times k$ is established, the first control portion 40 stops the switching of Q1 and Q2. On the other hand, in a period during which the AC voltage vac is above the threshold voltage $vb\times k$, that is, in a period during which $|vac|\leq vb\times k$ is established, the first control portion 40 performs switching of at least one of Q1 and Q2. Hence, when the AC voltage is high, a step-up operation or a step-down operation can be obtained at Q1 and Q2. The first control portion 40 performs switching of at least one of Q1 and Q2 during the switching period TSW1 at a duty ratio ($vb\times k/|vac|$) that varies sinusoidally during the switching period TSW1. The AC voltage vac varies sinusoidally. The duty ratio modulated according to the AC voltage vac is sinusoidal. In other words, the first control portion 40 performs switching of at least one of Q1 and Q2 during the switching period TSW1 at a duty ratio ($vb\times k/|vac|$) that varies so as to follow the AC voltage vac. According to this configuration, a transient variance can be suppressed.

The control device 9 includes a second control portion 50 used to control Q3 and Q4. In the example shown in the drawing, the second control portion 50 provides a step-up control portion for the forward mode and a step-down control portion for the reverse mode. The second control portion 50 serves also as a power factor correction portion. A drive signal of Q3 has a duty ratio Q3duty. A drive signal of Q4 has a duty ratio Q4duty.

The second control portion 50 includes a plurality of functional blocks 51 through 62. A setting portion 51 computes a command value $|iac|^*$ of the current. A computation portion 52 computes 1/Q1duty. A multiplication portion 53 computes a command value $iL^*$ of the reactor current. The command value $iL^*$ is expressed as: $iL^*=|iac|^*/Q1duty$. An input portion 54 inputs a detection value iL of the reactor current. An addition portion 55 adds the command value $-iL^*$ and the detection value iL. As a result, a deviation diL can be found. The deviation diL is expressed as: $diL=iL-iL^*$.

The feedback control portion 56 sets a feedback control amount FB. The feedback control portion 56 computes the control amount FB to reduce the deviation diL. The feedback control portion 56 computes the control amount FB according to proportional and integral (PI) control. Various types of feedback control method, such as PID control and hysteresis control, can be used instead of PI control.

A computation portion 57 outputs $|vac|\times Q1duty$. An addition portion 58 adds the control amount $-FB$ and $|vac|\times Q1duty$. A generation portion 59 outputs 1/vb. A multiplication portion 60 multiplies $|vac|\times Q1duty-FB$ by 1/vb. An output of the multiplication portion 60 is expressed as: $(|vac|\times Q1duty-FB)/vb$.

A pulse width modulation portion (PWM) 61 outputs a pulse signal having a duty ratio corresponding to an output from the multiplication portion 60. This pulse signal is used as the drive signal of Q3. An inverter 62 outputs the drive signal of Q4 by inverting the drive signal of Q3.

The second control portion 50 controls Q3 and Q4 according to the AC voltage vac and the DC voltage vb so as to perform feedback control by which the reactor current iL is fed back to the command value $iL^*$. The second control portion 50 controls at least one switching element to switch at a duty ratio set so as to approximate the reactor current iL to the command value $iL^*$. The detection value iL of the reactor current can be therefore approximated to the command value $iL^*$. The second control portion 50 performs the power factor correction control over the entire cycle of the AC voltage vac by the switching of at least one of Q3 and Q4. Hence, the control device 9 performs the power factor correction by the switching of Q3 and Q4 during all the periods including the stop period TDS1.

Figure 4:
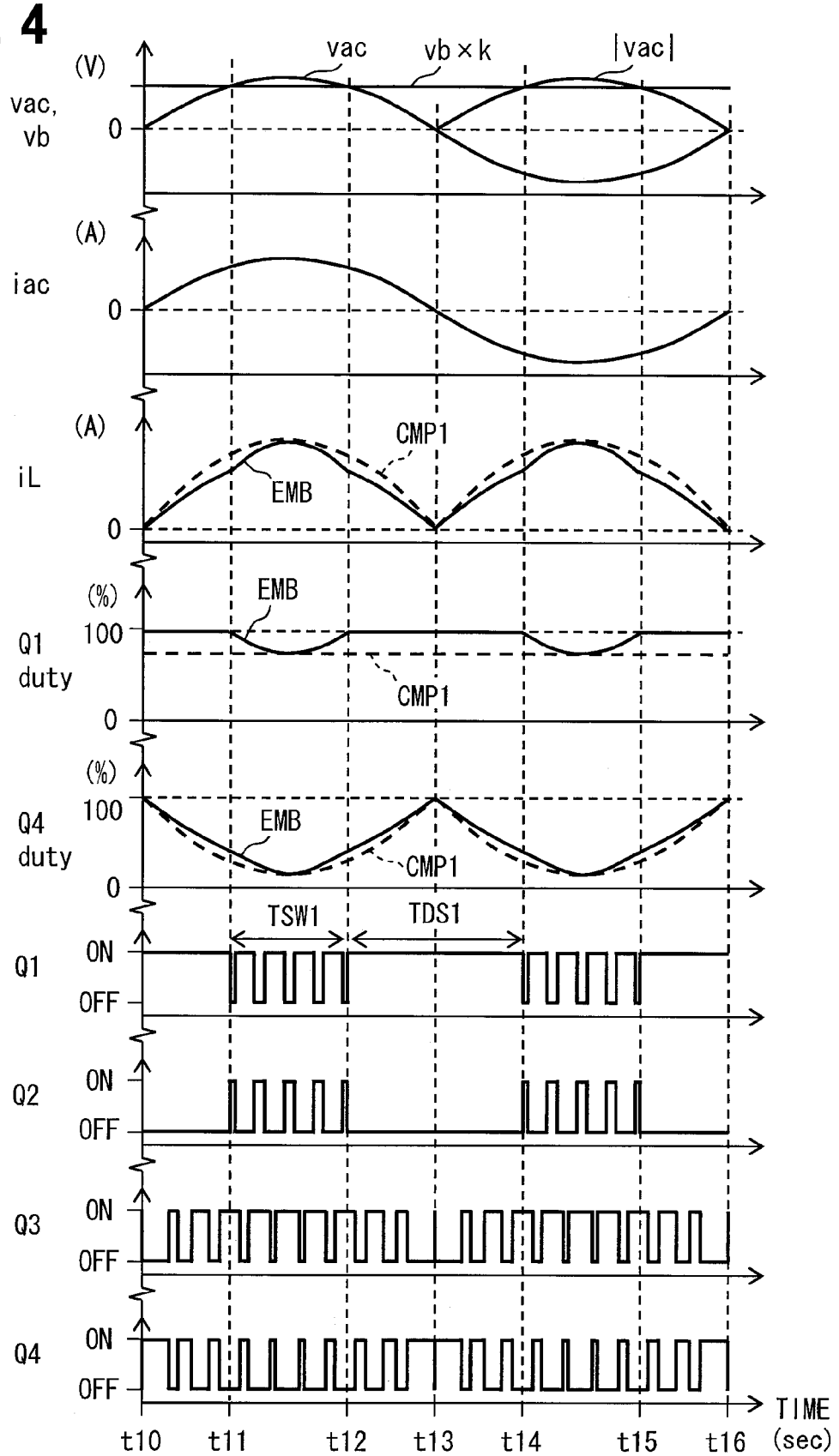
FIG. 4 is a timing chart showing an example of an operation of the first embodiment.

FIG. 4 shows an operation state of the power conversion apparatus 2. In the drawing, solid lines EMB represent waveforms of this embodiment. Broken lines CMP1 represent waveforms in a case where the duty ratio Q1duty of the drive signal of Q1 is fixed to a constant value. It should be noted that the drawing shows waveforms from which fine ripples are eliminated. The DC voltage vb is smaller than a maximum value of the AC voltage vac. Owing to the power factor correction control, the AC current iac is substantially in phase with the AC voltage vac.

In the example shown in the drawing, $|vac|\leq vb\times k$ is established in a period between a time t10 and a time t11, a period between a time t12 and a time t13, a period between a time t13 and a time t14, and a period between a time t15 and a time t16. During these periods, Q1 is fixed in an ON state and Q2 is fixed in an OFF state. These periods are the stop period TDS1.

Also, $|vac|>vb\times k$ is established in a period between the time t11 and the time t12 and a period between the time t14 and the time t15. During these periods, Q1 and Q2 are switched. These periods are the switching period TSW1.

Herein, Q1duty becomes lower than 100% only during the switching period TSW1 alone. Q1duty takes a value that is less than 100% and greater than 0% during the switching period TSW1 alone. Q1duty takes a value between a fixed value D1, which is used for voltage control and corresponds to a ratio of the maximum value of the AC voltage vac to the threshold voltage $vb\times k$, and 100% during the switching period TSW1 alone. Q1duty takes a voltage control value corresponding to a ratio of the absolute value |vac| to the threshold voltage vb×k during the switching period TSW1 alone.

In this embodiment, the number of switching times of Q1 and Q2 is reduced by providing the stop period TDS1. As a result, switching losses at Q1 and Q2 can be reduced.

Also, the reactor current iL indicated by the solid line EMB is smaller than the reactor current iL indicated by the broken line CMP1 during the stop period TDS1. The reactor current iL can be expressed as: iL=|iac|/Q1duty. In short, the reactor current iL increases when Q1duty becomes small. In this embodiment, because Q1duty is 100%, the reactor current iL is suppressed. Accordingly, a conduction loss and an iron loss occurring in the reactor 19 can be reduced.

Further, a current flowing to Q1 through Q4 can be also reduced because the reactor current iL is reduced. Hence, switching losses and conduction losses at Q1 through Q4 can be reduced.

Second Embodiment

In the embodiment above, Q1 and Q2 making a pair are driven complementarily and Q3 and Q4 making a pair are driven complementarily. Instead of this configuration, only the switch element necessary in the forward mode may be driven. Also, only the switch element necessary in the reverse mode may be driven.

This embodiment is a modification based on the preceding embodiment as to the fundamental configuration. The power conversion apparatus 2 includes the configuration shown in FIG. 1. The control device 9 includes a configuration shown in FIG. 5. The control device 9 includes a first control portion 240.

A setting portion 246 outputs a signal having a duty ratio of 0% to fix Q2 in an OFF state. A switch portion 247 selects either a signal set by the pulse width modulation portion 44 or a signal set by the setting portion 246. A setting portion 248 outputs a signal having a duty ratio of 0% to fix Q1 in an OFF state. A switch portion 249 selects either a signal set by the pulse width modulation portion 44 or a signal set by the setting portion 248.

A setting portion 263 outputs a signal having a duty ratio of 0% to fix Q3 in an OFF state. A switch portion 264 selects either a signal set by the pulse width modulation portion 61 or a signal set by the setting portion 263. A setting portion 265 outputs a signal having a duty ratio of 0% to fix Q4 in an OFF state. A switch portion 266 selects either a signal set by the pulse width modulation portion 61 or a signal set by the setting portion 265.

The switch portions 247, 249, 264, and 266 select (F) in the forward mode and (R) in the reverse mode.

Figure 5:
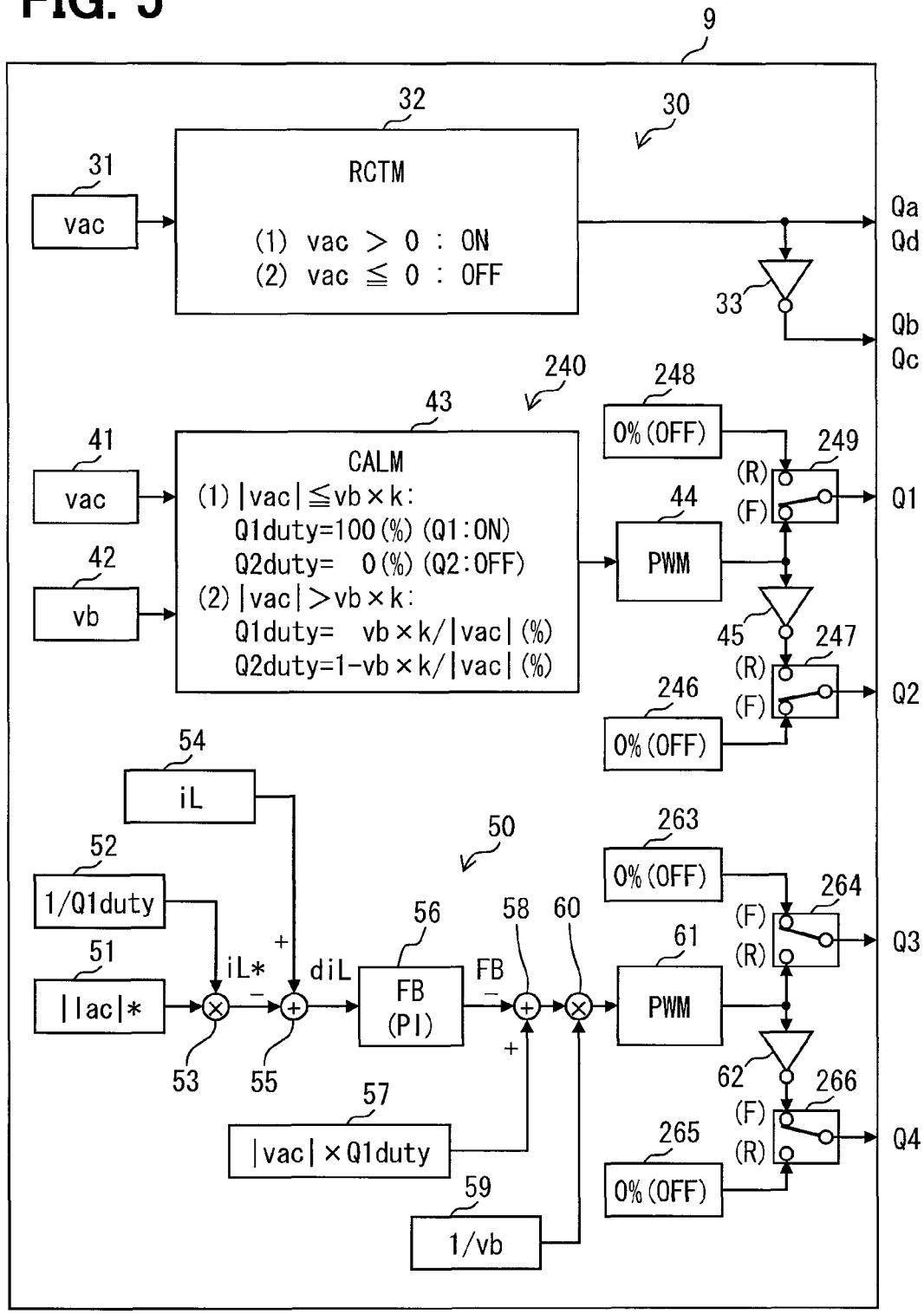
FIG. 5 is a block diagram showing a part of a control device according to a second embodiment.

FIG. 5 shows a circuit state in the forward mode. In the forward mode, the control device 9 holds Q2 and Q3 in an OFF state continuously. A current for the forward mode can flow through diodes of Q2 and Q3. The control device 9 performs step-up and -down control by controlling Q1 and Q4 to switch. The control device 9 thus generates the DC voltage vb across the capacitor 8 by converting the AC voltage vac to the DC voltage vb. When power is supplied from the AC end 2a to the DC end 2b, the first control portion 240 fixes Q1 in an ON state and Q2 in an OFF state during the stop period TDS1. The number of switching times can be thus reduced.

The first control portion 240 performs the switching of Q1 and stops the switching of Q2 during the switching period TSW1. Because both Q1 and Q2 are not switched owing to this configuration, a step-wise fluctuation of the duty ratio caused by a dead time can be suppressed.

Figure 6:
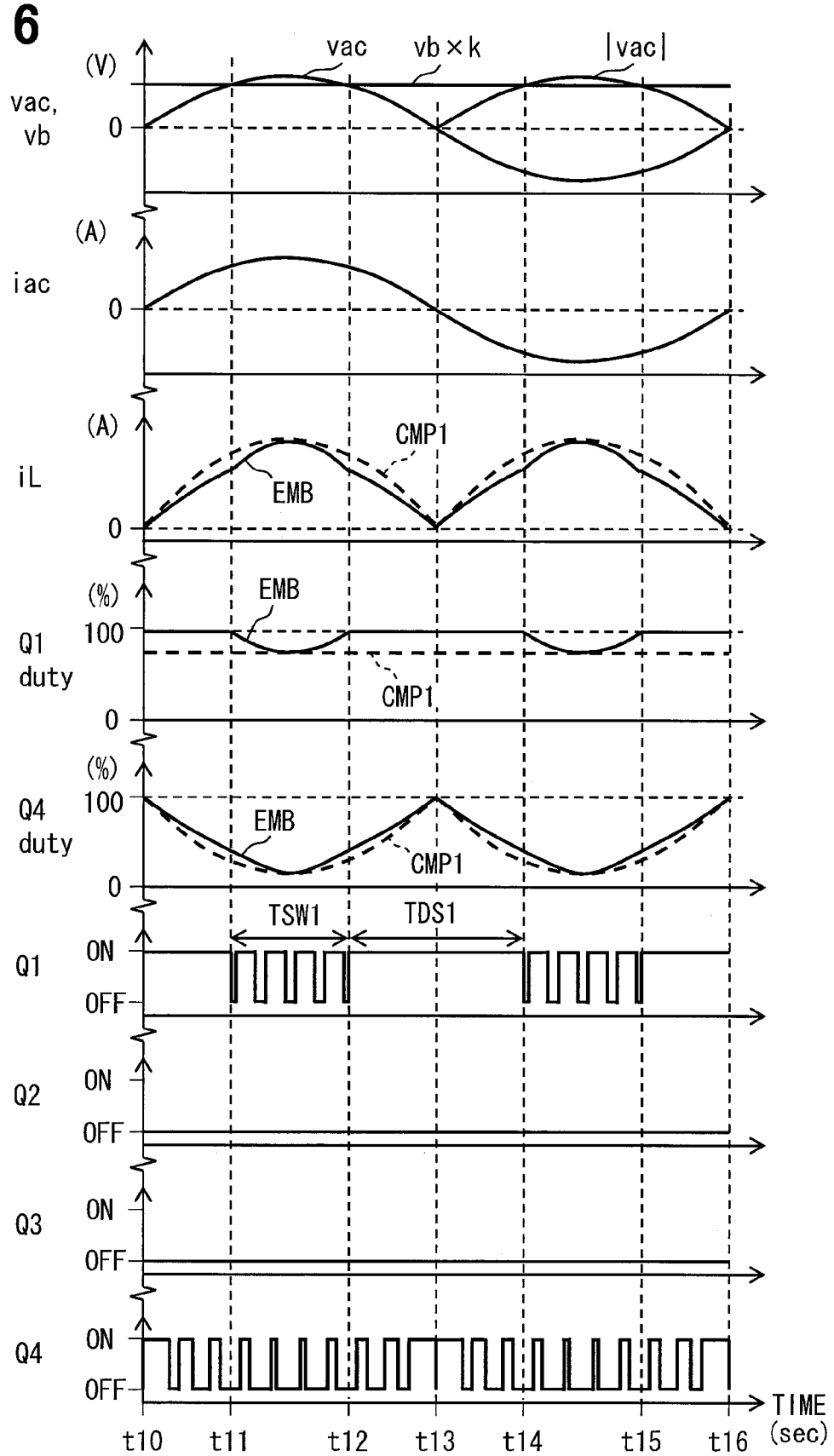
FIG. 6 is a timing chart showing an example of an operation of the second embodiment.

FIG. 6 shows an operation state of the power conversion apparatus 2. In this embodiment, Q2 and Q3 are fixed in an OFF state without depending on a variance of the AC voltage vac. Hence, losses can be suppressed further in this embodiment than in the preceding embodiment.

Figure 7:
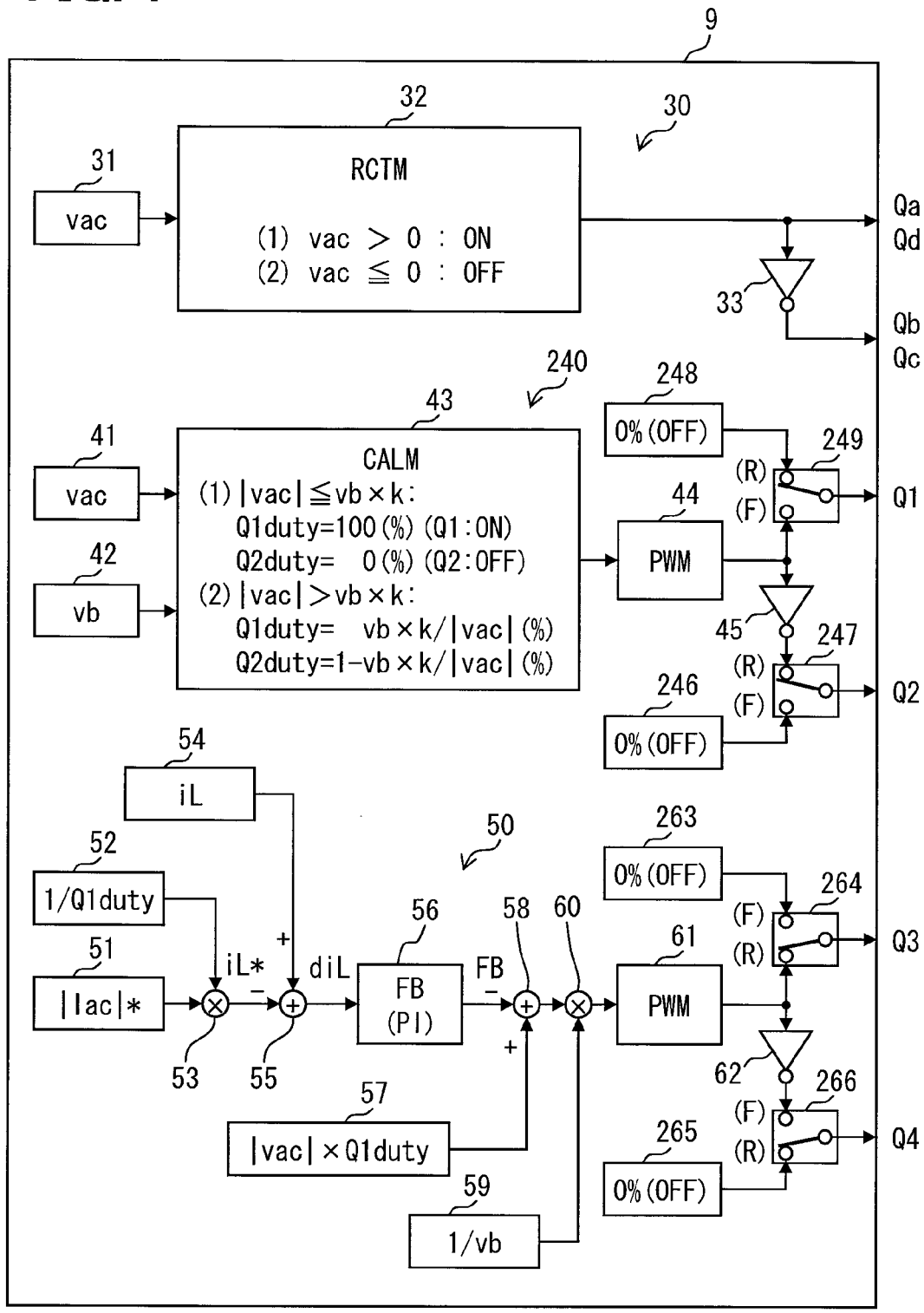
FIG. 7 is a block diagram showing a part of the control device of the second embodiment.

FIG. 7 shows a circuit state in the reverse mode. In the reverse mode, the control device 9 holds Q1 and Q4 in an OFF state continuously. A current for the reverse mode can flow through diodes of Q1 and Q4. The control device 9 performs the step-up and -down control by controlling Q2 and Q3 to switch. The control device 9 thus generates the DC voltage vb across the bridge circuit 6 by converting the DC voltage vb to the AC voltage vac. When power is supplied from the DC end 2b to the AC end 2a, the first control portion 240 fixes Q1 in an OFF state and Q2 in an OFF state during the stop period TDS1. The number of switching times can be thus reduced.

The first control portion 240 performs the switching of Q2 and stops the switching of Q1 during the switching period TSW1. Because both Q1 and Q2 are not switched owing to this configuration, a step-wise fluctuation of the duty ratio caused by a dead time can be suppressed.

Figure 8:
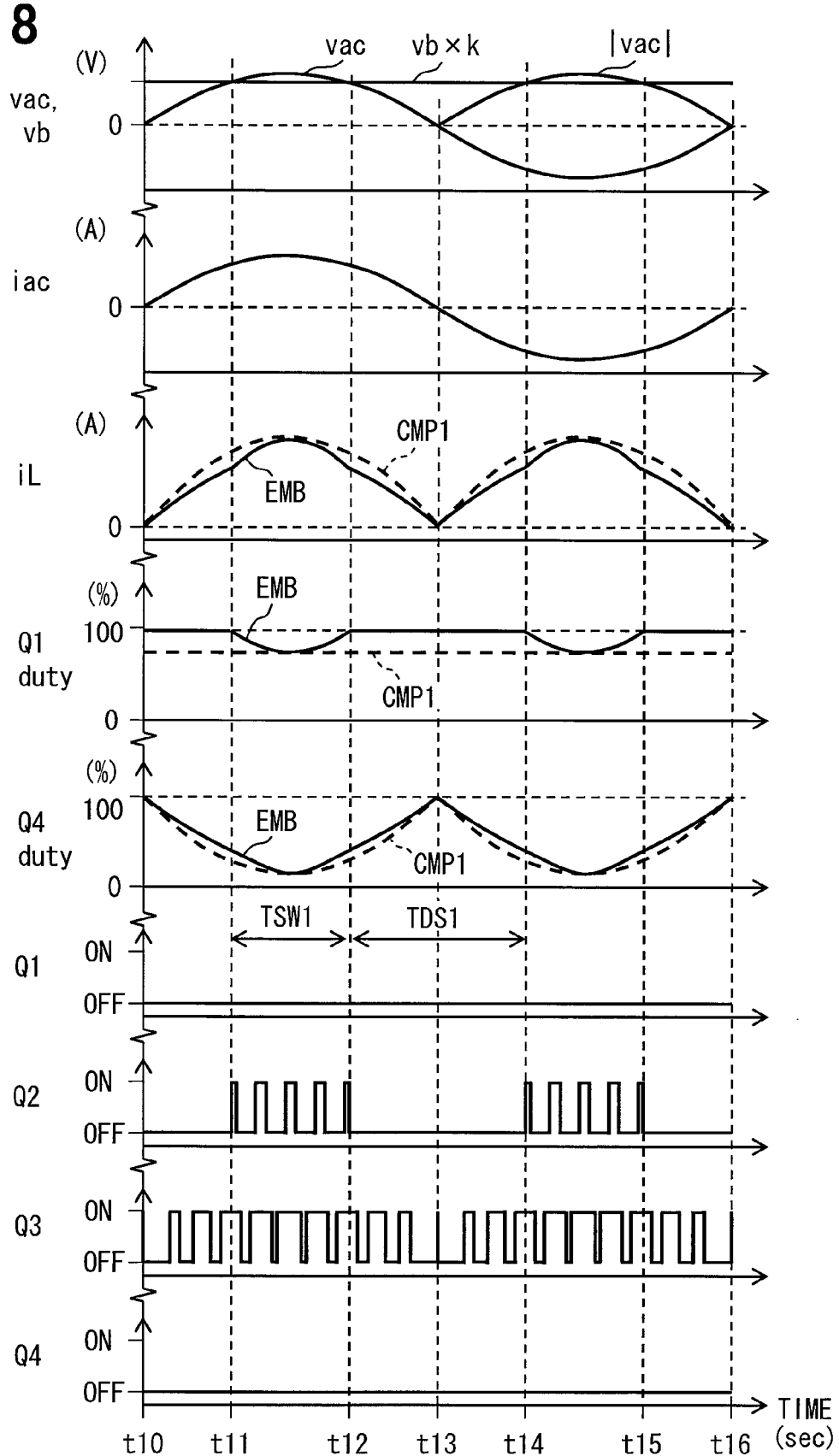
FIG. 8 is a timing chart showing another example of the operation of the second embodiment.

FIG. 8 shows an operation state of the power conversion apparatus 2. In this embodiment, Q1 and Q4 are fixed in an OFF state without depending on a variance of the AC voltage vac. Hence, losses can be suppressed further in this embodiment than in the preceding embodiment.

Third Embodiment

In the embodiments above, the control device 9 modulates Q1duty so that Q1duty varies sinusoidally with the absolute value |vac| during the switching period TSW1. Instead of this configuration, the control device 9 may fix Q1duty to a predetermined constant value during the switching period TSW1.

Figure 9:
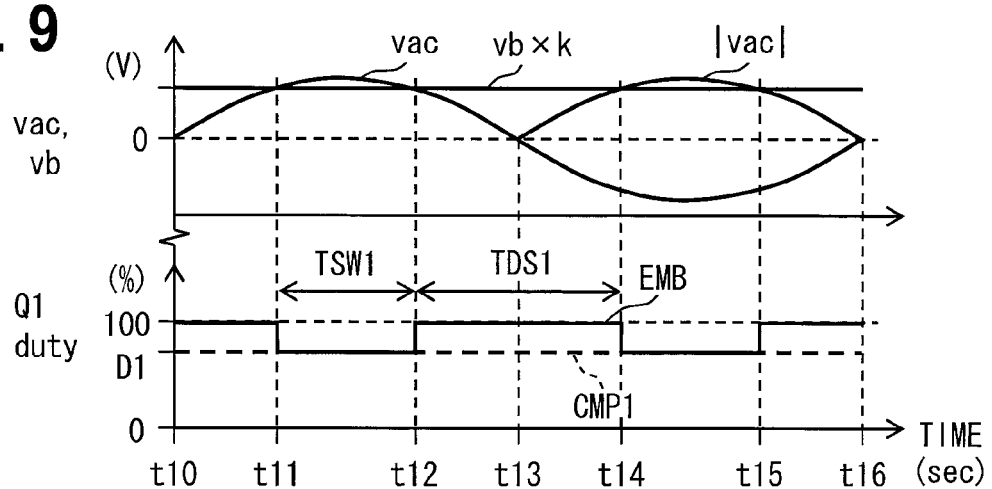
FIG. 9 is a timing chart showing an example of an operation according to a third embodiment.

This embodiment is a modification based on the preceding embodiments as to the fundamental configuration. FIG. 9 shows a waveform of Q1duty provided in this embodiment. Herein, Q1duty is fixed to a fixed value D1 during the switching period TSW1. The fixed value D1 is a value corresponding to a ratio of the maximum value of the AC voltage vac to the threshold voltage vb×k. Because the stop period TDS1 is provided, losses can be suppressed in this embodiment, too.

Fourth Embodiment

This embodiment is a modification based on the preceding embodiments as to the fundamental configuration. In this embodiment, the control device 9 fixes Q1duty to a predetermined constant value during the switching period TSW1. Further, the control device 9 gradually changes Q1duty from the beginning to the end of the switching period TSW1. The first control portion 240 performs the switching of at least one of Q1 and Q2 during the switching periods TSW1 at a duty ratio that varies trapezoidally during the switching period TSW1.

Figure 10:
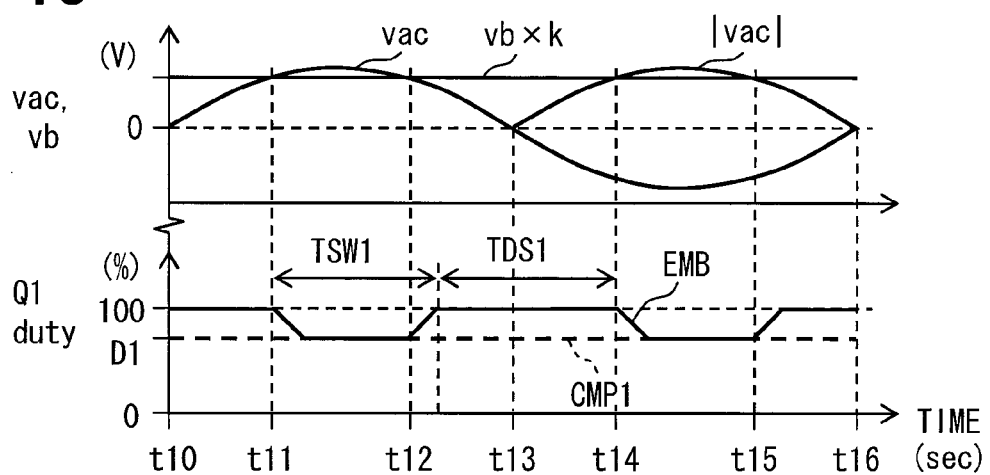
FIG. 10 is a timing chart showing an example of an operation according to a fourth embodiment.

FIG. 10 shows a waveform of Q1duty provided in this embodiment. Herein, Q1duty starts to decrease gradually after the time t11, which is the beginning of the period. Q1duty eventually reaches the fixed value D1 when a predetermined delay time has elapsed since the time t11. Q1duty starts to increase gradually after the time t12, which is the end of the period. Q1duty eventually restores to 100% when a predetermined delay time has elapsed since the time t12. Owing to this configuration, a transient response caused by a step-wise variance of Q1duty can be suppressed. Because the stop period TDS1 is provided, losses can be suppressed in this embodiment, too.

Comparative Examples

Figure 11:
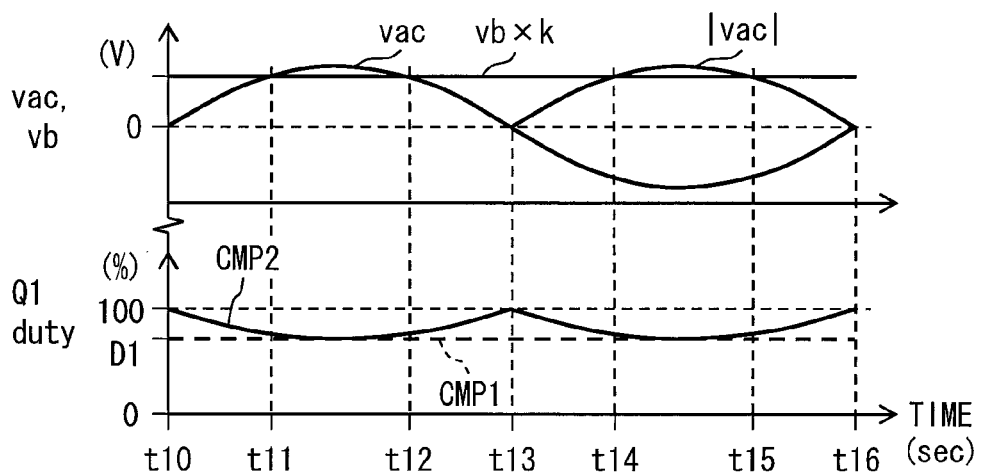
FIG. 11 is a timing chart showing comparative examples.

FIG. 11 shows waveforms of Q1duty provided in comparative examples. In the drawing, a broken line CMP1 represents a comparative example in which Q1duty is fixed to the fixed value D1 over all the periods. A solid line CMP2 represents another comparative example in which Q1duty is modulated sinusoidally over all the periods. In these comparative examples, Q1 is controlled to switch during all the periods. Hence, losses arising from the switching occur in all the periods.

Fifth Embodiment

Figure 12:
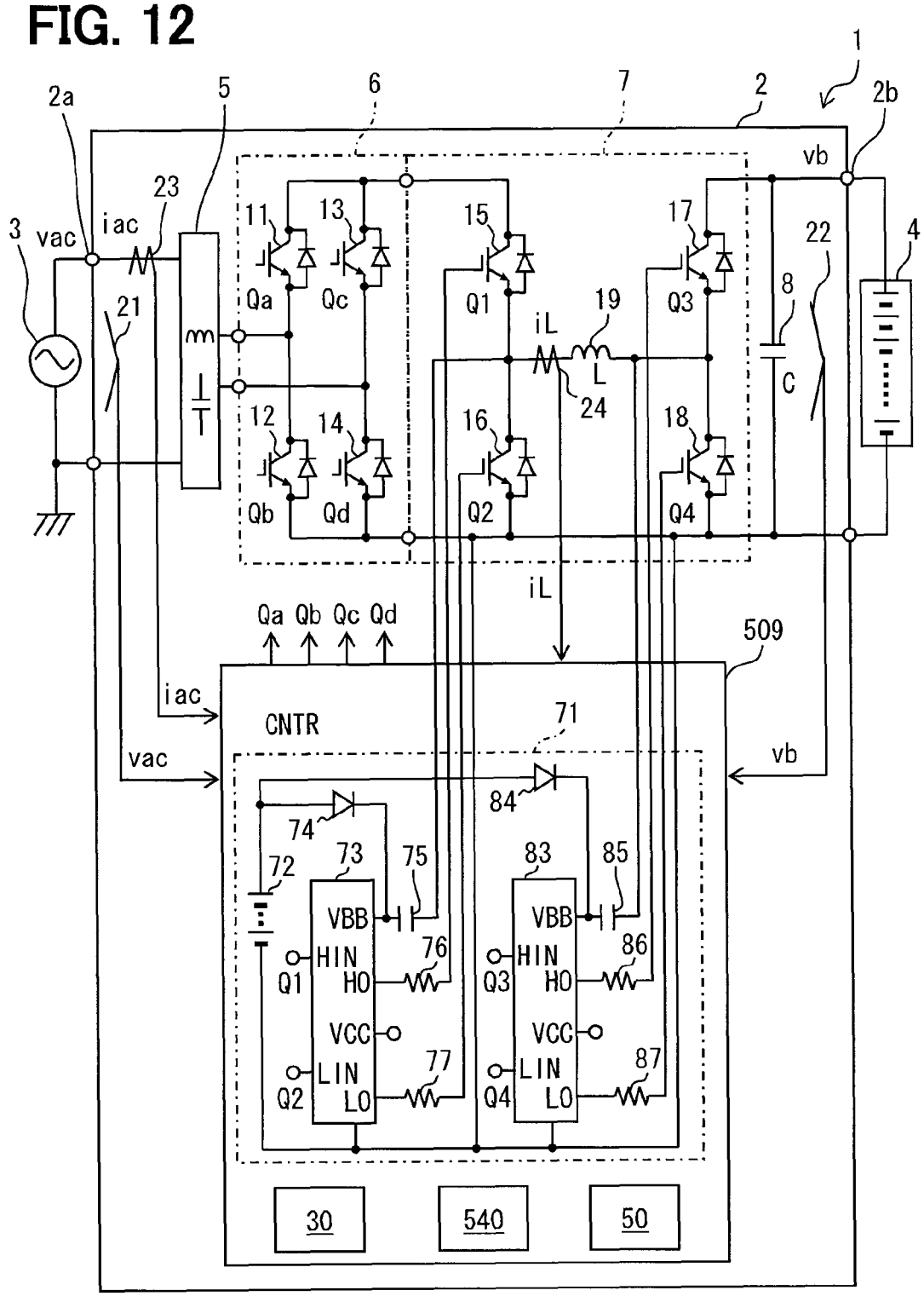
FIG. 12 is a block diagram showing a power conversion apparatus according to a fifth embodiment.

FIG. 12 is a block diagram showing a power conversion apparatus 2 according to a fifth embodiment. This embodiment is a modification based on the preceding embodiments as to the fundamental configuration. In this embodiment, the DC voltage vb is always higher than the AC voltage vac.

The power conversion apparatus 2 includes a control device 509. The control apparatus 509 includes a drive circuit 71 used to drive the switch elements 15 through 18. The drive circuit 71 is formed as a bootstrap circuit.

The drive circuit 71 includes a power supply 72. The power supply 72 is a power supply for the drive circuit 71. The power supply 72 also serves as a gate drive power supply used to supply charges to gates of the switch elements 15 through 18.

The drive circuit 71 includes circuit parts 73 through 77 used to drive Q1 and Q2 making a pair. Q1 is a high-side switch and Q2 is a low-side switch. The circuit parts 73 through 77 form a bootstrap circuit used to drive Q1 by bootstrapping. An integrated circuit 73 is an integrated circuit forming the bootstrap circuit. The integrated circuit 73 is a drive circuit available in a power MOSFET and an IGBT and it is a drive circuit having a high-side output and a low-side output. The integrated circuit 73 can be provided, for example, by IR2113 commercially available from International Rectifier, Japan.

The integrated circuit 73 has an input terminal HIN for the high-side switch, a floating power supply terminal VBB for the high-side switch, and an output terminal HO for the high-side switch. The integrated circuit 73 supplies charges given to the power supply terminal VBB to the output terminal HO in response to a signal given to the input terminal HIN.

The integrated circuit 73 has an input terminal LIN for the low-side switch, a power supply terminal VCC for the low-side switch, and an output terminal LO for the low-side switch. The integrated circuit 73 supplies charges given to the power supply terminal VCC to the low-side output LO in response to a signal given to the input terminal LI.

A diode 74 has an anode connected to a positive terminal of the power supply 72 and a cathode connected to the power supply voltage VBB. One end of the capacitor 75 is connected to an intermediate point of Q1 and Q2. The other end of the capacitor 75 is connected to the cathode of the diode 74 and the power supply terminal VBB. The output terminal HO is connected to the gate of Q1 via a resistor 76. Charges are supplied to the power supply terminal VCC from the power supply 72. The output terminal LO is connected to the gate of Q2 via a resistor 77.

When Q2 is in an ON state, a current flows through a closed circuit including the power supply 72, the diode 74, the capacitor 75, Q2, and a ground line. The capacitor 75 is charged with this current. Charges charged to the capacitor 75 are supplied to the gate of Q1 from the output terminal HO by way of the resistor 76 in response to an ON signal to the input terminal HIN. A power supply to drive Q1, which is the high-side switch, to be in an ON state is obtained from the capacitor 75.

In this manner, the control device 509 includes the drive circuit 71 as the bootstrap circuit including the capacitor 75 charged when Q2 is in an ON state. When Q1 is driven to be in an ON state, the drive circuit 71 as the bootstrap circuit supplies charges charged to the capacitor 75 to the control terminal, that is, the gate of Q1.

The first control portion 540 sets a stop period TDS2 in a period during which the AC voltage vac is above a reference voltage Vref (|vac|>Vref). To be more concrete, the first control portion 540 defines a period during which the maximum value Vm of the AC voltage vac is below the DC voltage vb across the DC end 2b and the AC voltage vac is above the predetermined reference voltage Vref (|vac|>Vref) as the stop period TDS2.

The first control portion 540 defines a period during which the AC voltage vac is below the reference voltage Vref (|vac|<Vref) as a switching period TSW2. To be more concrete, the first control portion 540 defines a period during which the maximum value Vm is below the DC voltage vb and the AC voltage vac is below the reference voltage Vref (|vac|<Vref) as the switching period TSW2.

The first control portion 540 performs the switching of Q1 and Q2 during the switching period TSW2. During the switching period TSW2, the first control portion 540 performs the switching of Q1 and Q2. Hence, the capacitor 75 of the drive circuit 71 as the bootstrap circuit is charged and the switching of Q1 as the high-side switch is enabled.

The drive circuit 71 includes circuit parts 83 through 87 used to drive Q3 and Q4 making a pair. The circuit parts 83 through 87 form a bootstrap circuit used to drive Q3 by bootstrapping. The circuit parts 83 through 87 are the same as the circuit parts 73 through 77 described above and provide a similar circuit.

The bootstrap circuit can make the circuit used to drive the high-side switch more compact. In this embodiment, because the high-side switch is driven by the bootstrap circuit, the control device 9 drives the low-side switch complementarily in a period during which the high-side switch needs to be driven.

Figure 13:
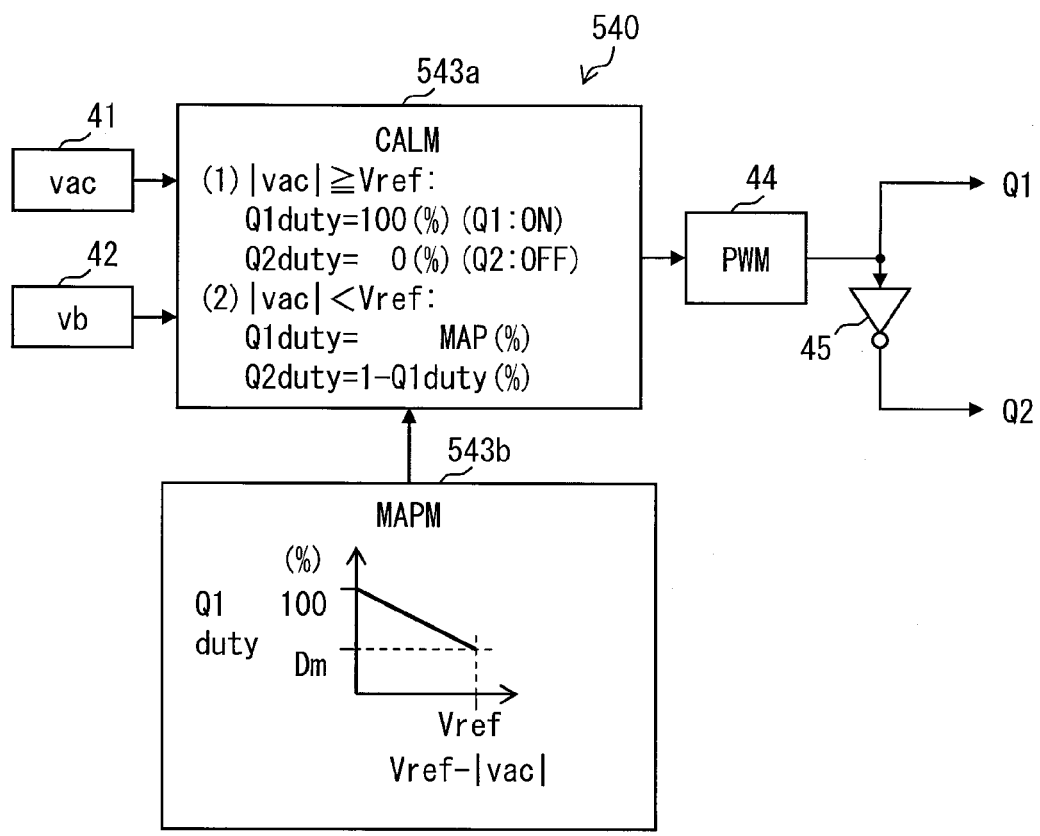
FIG. 13 is a block diagram showing a part of a control device of the fifth embodiment.

As is shown in FIG. 12, the control device 509 includes the first control portion 540 used to control Q1 and Q2. FIG. 13 shows blocks of the first control portion 540. In the example shown in the drawing, the first control portion 540 provides a step-down control portion for the forward mode and a step-up control portion for the reverse mode.

The first control portion 540 includes a calculation portion 543a. The calculation portion 543a compares the absolute value |vac| of the AC voltage vac with the predetermined reference voltage Vref. The reference voltage Vref is a voltage lower than the DC voltage vb. The reference voltage Vref is set to define the switching period TSW2 before and after the AC voltage vac crosses zero.

It is preferable to set the reference voltage Vref to a value less than half the maximum value Vm of the AC voltage vac. When configured in this manner, a long stop period TDS2 can be set. It is more preferable to set the reference voltage Vref to be less than one-fifth the maximum value Vm of the AC voltage vac. The purpose of this configuration is to set the stop period TDS2 longer. It is further preferable to set the reference voltage Vref to about one-tenth the maximum value Vm of the AC voltage vac. The purpose of this configuration is to set the stop period TDS2 further longer.

The calculation portion 543a sets Q1duty to 100% and Q2duty to 0% when |vac|≥Vref. In other words, the first control portion 540 fixes Q1 in an ON state and Q2 in an OFF state during the stop period TDS2. The calculation portion 543a sets Q1duty according to a map and Q2duty to (1−Q1duty) % when |vac|<Vref.

The first control portion 540 includes a map (MAPM) 543b. The map 543b sets Q1duty when |vac|<Vref. The map 543b sets Q1duty according to a difference between the absolute value |vac| and Vref. The map 543b sets Q1duty so that Q1duty reaches 100% when Vref=|vac| and Q1duty degreases with a decrease of the absolute value |vac|. Herein, Q1duty does not decrease to 0 even when the absolute value |vac| decreases to 0. The map 543b sets Q1duty to a minimum value Dm when the absolute value |vac| is 0.

In this embodiment, |vac|<vb is established continuously. The control device 509 directly connects the bridge circuit 6 and the comparator circuit 7 when |vac|≥Vref by closing Q1 and opening Q2. When |vac|<Vref, the control device 509 performs the switching of Q1 and Q2 at a ratio corresponding to a difference between the absolute value |vac| and the DC voltage vb. The first control portion 540 performs the switching of Q1 during the switching period TSW2 at a duty ratio that varies so as to take a minimal value at polarity reversion of the AC voltage vac. In other words, Q1 and Q2 are controlled so as to perform the step-down control in the forward mode and the step-up control in the reverse mode.

Figure 14:
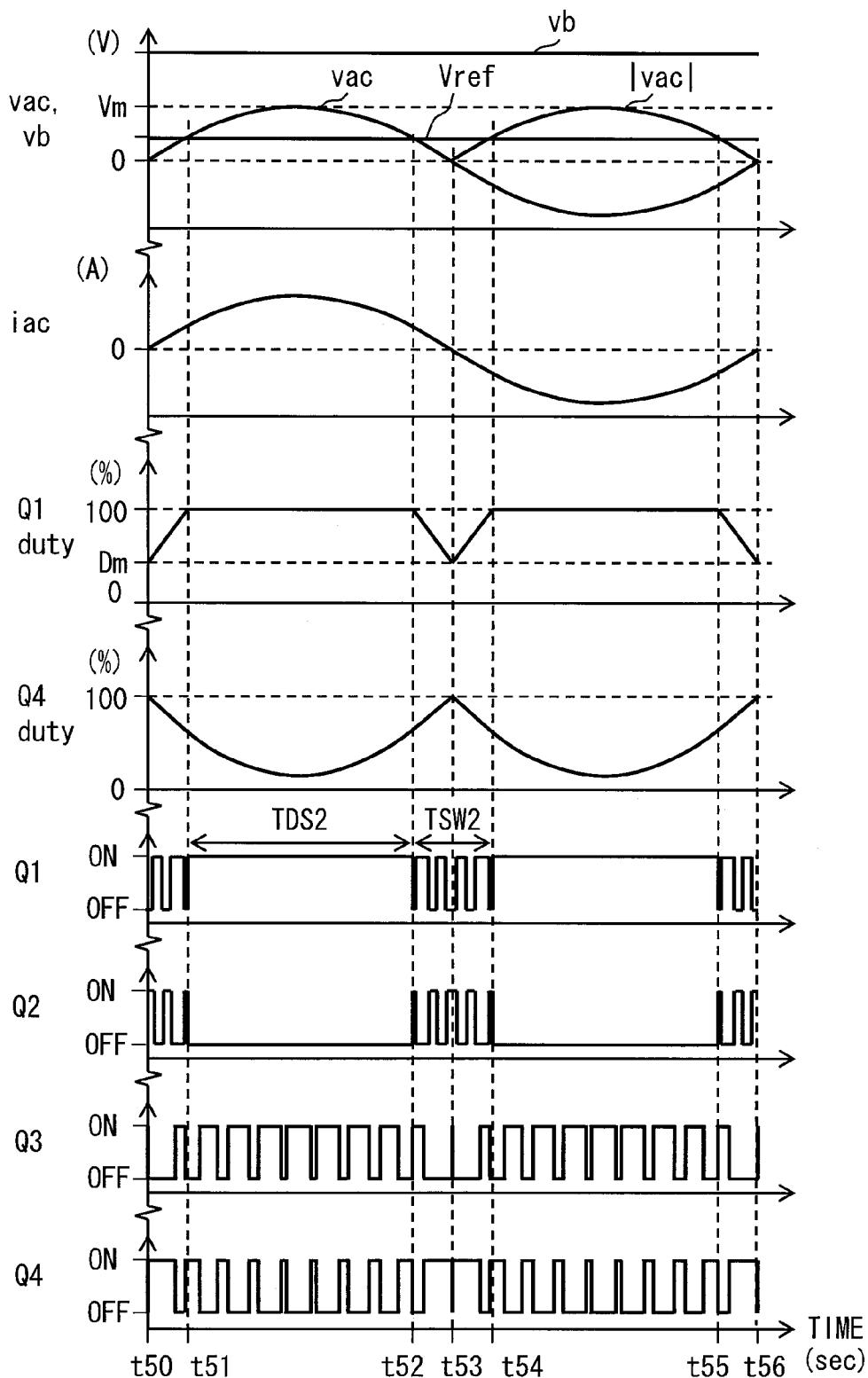
FIG. 14 is a timing chart showing an example of an operation of the fifth embodiment.

FIG. 14 shows an operation state of the power conversion apparatus 2. The drawing shows waveforms from which fine ripples are eliminated. Also, in order to sharply show the switching period TSW2, the drawing shows the reference voltage Vref higher than the actual one. The DC voltage vb is higher than the maximum value of the AC voltage vac. The AC current iac is brought substantially in phase with the AC voltage vac by the power factor correction control.

In the example shown in the drawing, |vac|<Vref is established in a period between a time t50 and a time t51, a period between a time t52 and a time t53, a period between a time t53 and a time t54, and a period between a time t55 and a t56. During these periods, Q1 and Q2 are driven to switch. These periods are the switching period TSW2.

Herein, Q1duty starts to decrease gradually from 100% after the time t52. Q1duty takes a minimal value, that is, the minimum value Dm at the time t53. In other words, Q1duty takes the minimal value when the polarity of the AC voltage vac is reversed, that is, when the AC voltage vac crosses zero. Also, Q1duty starts to increase gradually toward 100% after the time t53. Owing to this configuration, a transient response caused by a step-wise variance of Q1duty can be suppressed.

Herein, |vac|≥Vref is established in a period between the time t51 and the time t52 and a period between the time t54 and the time t55. During these periods, Q1 is fixed in an ON state and Q2 is fixed in an OFF state. These periods are the stop period TDS2.

Herein, Q1duty becomes lower than 100% during the switching period TSW2 alone. Q1duty takes a value that is less than 100% and greater than 0% during the switching period TSW2 alone.

In this embodiment, the number of switching times of Q1 and Q2 can be reduced by providing the stop period TDS2. As a result, switching losses at Q1 and Q2 can be reduced.

Figure 15:
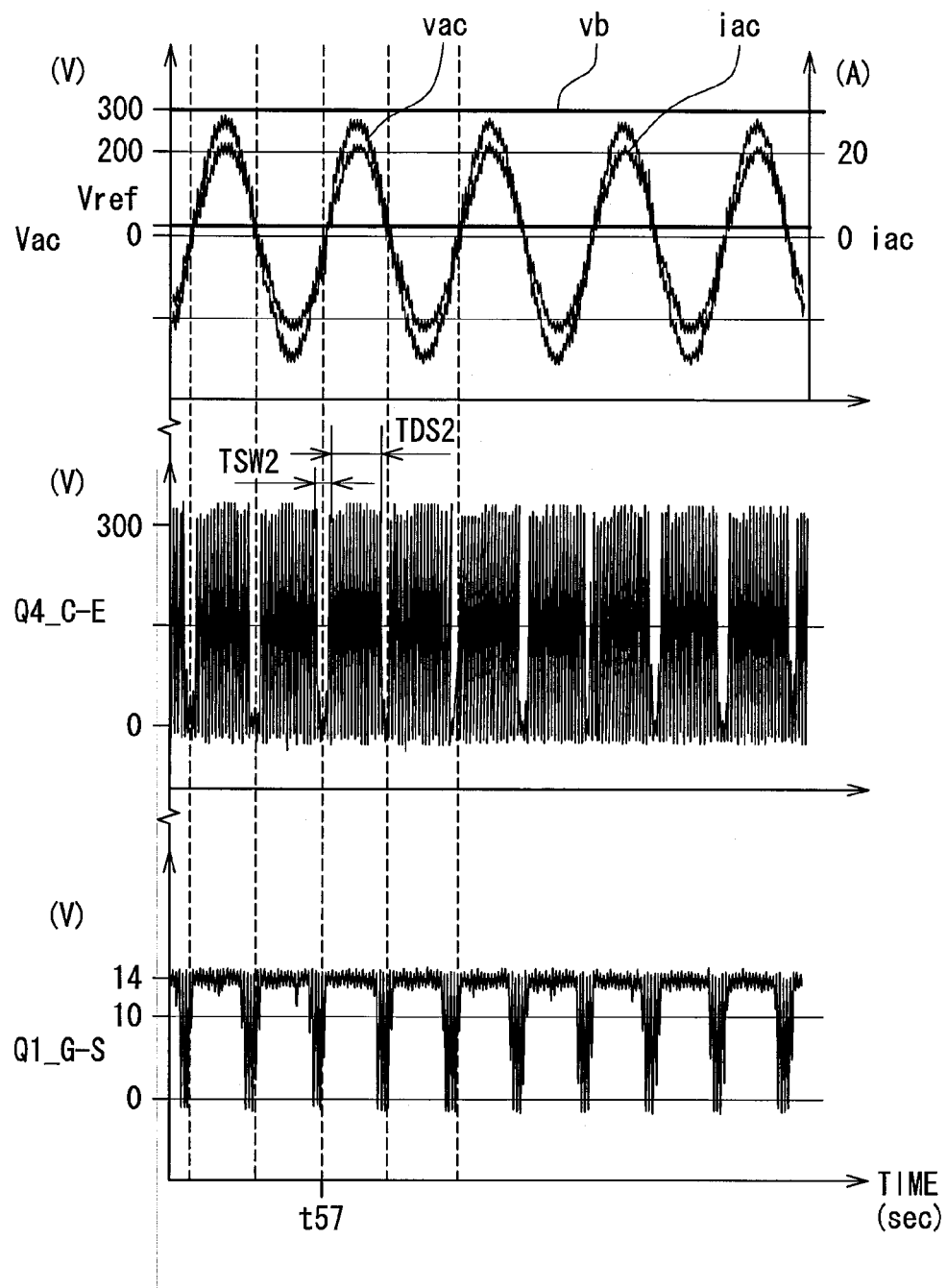
FIG. 15 is a timing chart showing another example of the operation of the fifth embodiment.

FIG. 15 shows an example of an operation of the fifth embodiment. The drawing shows waveforms in a case where the power conversion apparatus 2 is disposed between the AC power supply 3 of 200 Vac and the DC power supply 4 of 300 V and performs a charge operation at 3 kW. In the drawing, Q4_C-E indicates a collector-emitter voltage of Q4, that is, an output voltage. Q1_G-S indicates a gate-source voltage of Q1, that is, a gate voltage of Q1. In this example, the reference voltage Vref is set to one-tenth the maximum value of the AC voltage vac.

Periods during which the absolute value |vac| is above the reference voltage Vref are the stop period TDS2. Periods during which the absolute value |vac| is below the reference voltage Vref are the switching period TSW2. As is shown in the drawing, Q1 is driven to switch only during a short period before and after the time at which the AC voltage vac crosses zero. For example, the AC voltage vac crosses zero at the time t57. The switching period TSW2 is set before and after the time t57.

In this example, the AC current iac varies sinusoidally in synchronous with the AC voltage vac. A power factor is 0.998. It can be therefore said that the power factor correction control functions in a satisfactory manner. The gate-source voltage of Q1 is maintained at about 14 V in a stable manner. In other words, the capacitor 75 of the bootstrap circuit continues to hold a voltage necessary to switch ON Q1.

Sixth Embodiment

This embodiment is a modification based on the preceding embodiments as to the fundamental configuration. In this embodiment, the control device 509 fixes Q1duty to a predetermined constant value during the switching period TSW2.

Figure 16:
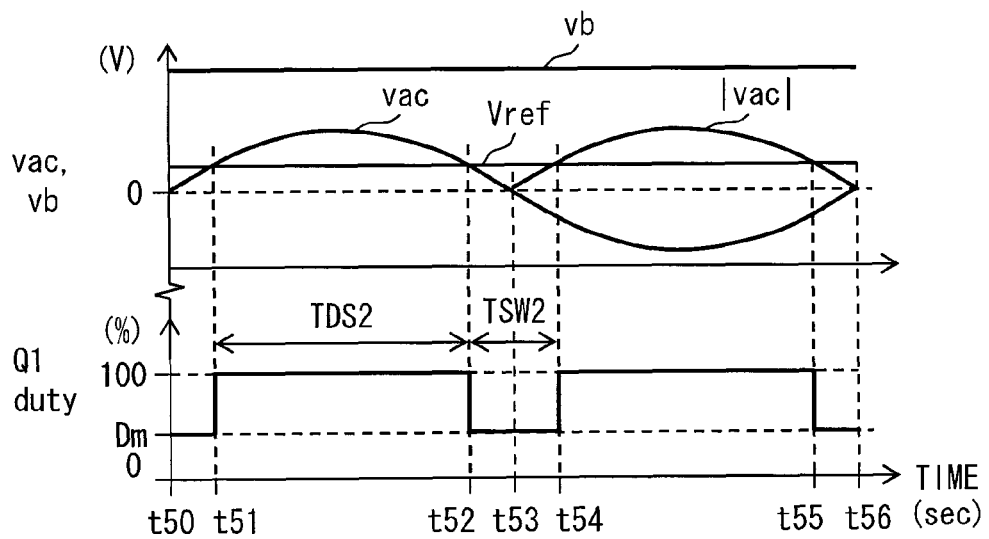
FIG. 16 is a timing chart showing an example of an operation according to a sixth embodiment.

FIG. 16 shows a waveform of Q1duty provided in this embodiment. Herein, Q1duty is fixed to a fixed value Dm during the switching period TSW2. Because the stop period TDS2 is provided, losses can be suppressed in this embodiment, too.

Seventh Embodiment

This embodiment is a modification based on the preceding embodiments as to the fundamental configuration. In this embodiment, the control device 509 fixes Q1duty to a predetermined constant value during the switching period TSW2. Further, the control device 509 gradually changes Q1duty from the beginning to the end of the switching period TSW2. The control device 509 changes Q1duty trapezoidally during the switching period TSW2.

Figure 17:
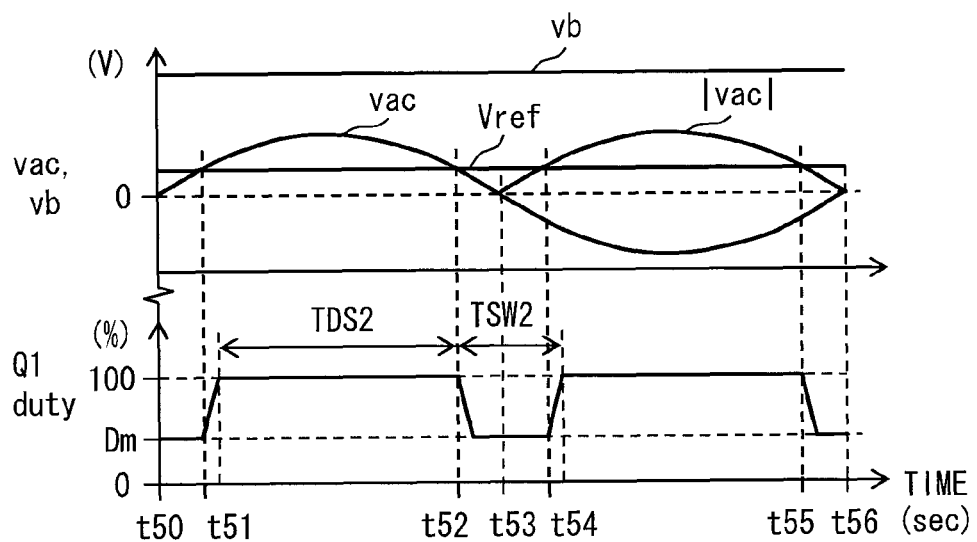
FIG. 17 is a timing chart showing an example of an operation according to a seventh embodiment.

FIG. 17 shows a waveform of Q1duty provided in this embodiment. Herein, Q1duty starts to decrease gradually after a time t52, which is the beginning of the period. Q1duty eventually reaches a fixed value Dm when a predetermined delay time has elapsed since the time t52. Q1duty starts to increase gradually after the time t54, which is the end of the period. Q1duty eventually restores to 100% when a predetermined delay time has elapsed since the time t54. Because the stop period TDS2 is provided, losses can be suppressed in this embodiment, too.

Eighth Embodiment

This embodiment is a modification based on the preceding embodiments as to the fundamental configuration. In this embodiment, the control device 509 changes Q1duty sinusoidally during the switching period TSW2.

Figure 18:
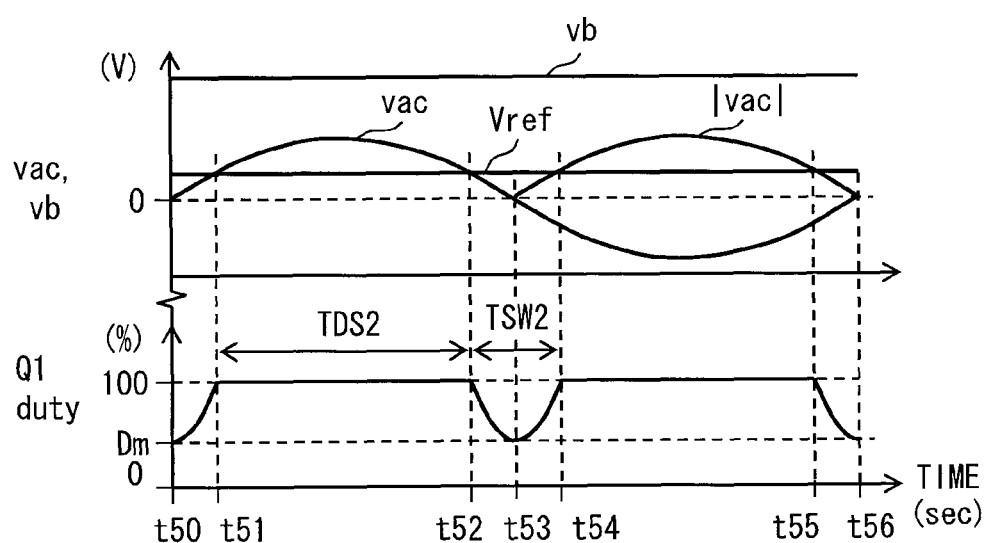
FIG. 18 is a timing chart showing an example of an operation according to an eighth embodiment.

FIG. 18 shows a waveform of Q1duty provided in this embodiment. Herein, Q1duty starts to decrease gradually after the time t52 to eventually reach the minimum value Dm and starts to increase gradually after the time t53 to eventually restore to 100%. Because the stop period TDS2 is provided, losses can be suppressed in this embodiment, too.

Ninth Embodiment

This embodiment is a modification based on the preceding embodiments as to the fundamental configuration. In this embodiment, a power conversion apparatus 2 shown in FIG. 12 is adopted. In the first embodiment above, the stop period TDS1 is set for Q1 and Q2 making a first pair and in Q3 and Q4 making a second pair according to a relation of the absolute value |vac| and the DC voltage vb. In addition, only one switching element in one pair corresponding to the forward direction or the reverse direction is stopped continuously, for example, only Q1 in the first pair of Q1 and Q2 is stopped continuously, in the second embodiment through the fourth embodiment above. Further, the bootstrap circuit is made available while suppressing harmonic components by driving the first pair of Q1 and Q2 to switch in the vicinity of a zero crossing point of the AC voltage vac in the fifth embodiment above. In this embodiment, the circuit configuration of the fifth embodiment above is adopted and the control in another preceding embodiment, for example, the control in the second embodiment above is additionally adopted.

Figure 19:
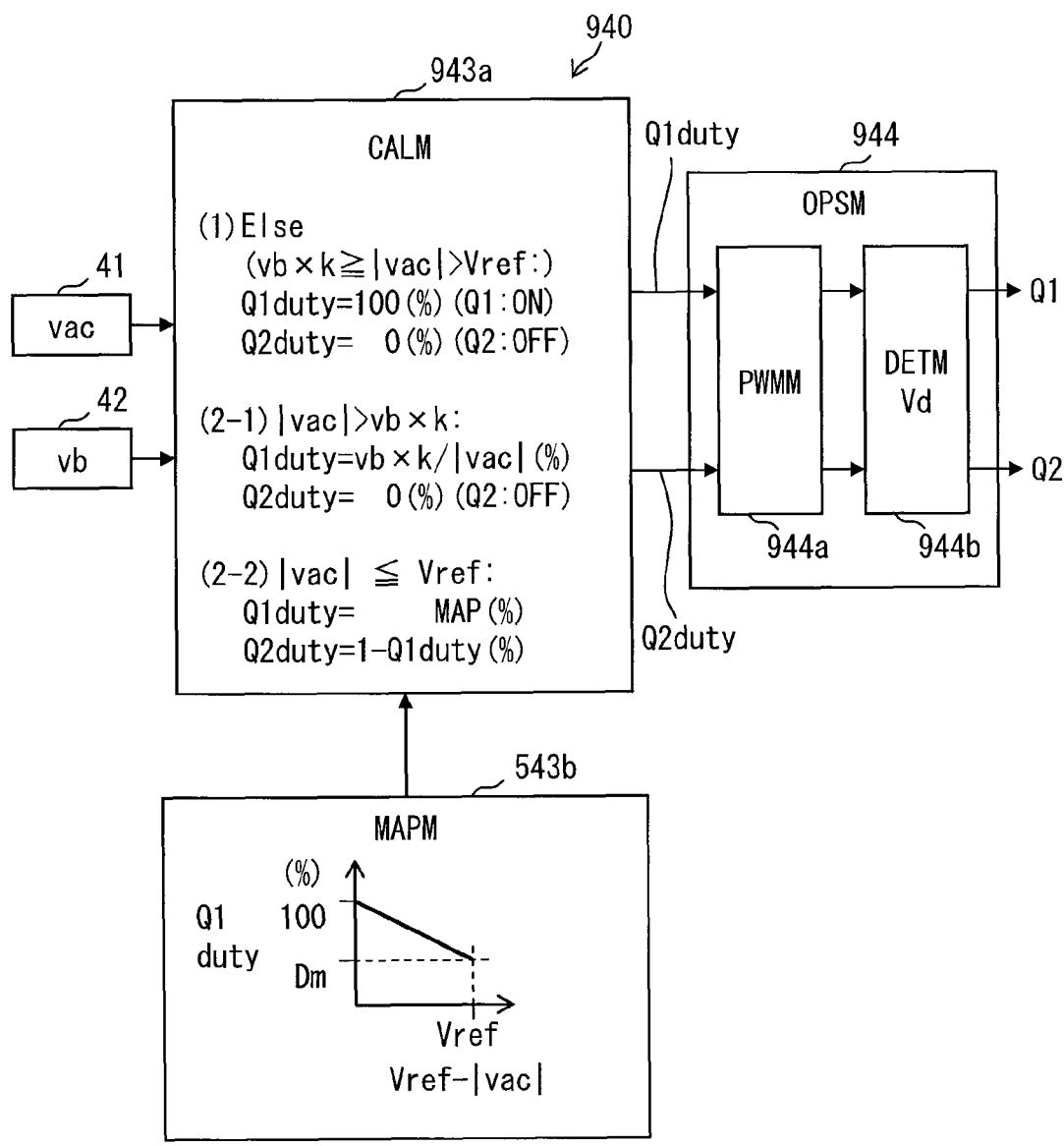
FIG. 19 is a block diagram showing a part of a control device according to a ninth embodiment.

FIG. 19 shows a first control portion 940 provided to the control portion 509. The first control portion 940 controls Q1 and Q2. The first control portion 940 provides a function equivalent to that of the first control portion 40 described in the second embodiment above.

The first control portion 940 includes a calculation portion 943a. The calculation portion 943a compares the absolute value |vac|, the threshold voltage vb×k, and the reference voltage Vref. The reference voltage Vref is a voltage lower than the threshold voltage vb×k. The calculation portion 943a sets three control modes according to relations among the threshold voltage vb×k, the reference voltage Vref, and the absolute value |vac|.

(1) Stop Mode

When vb×k≥|vac|>Vref, the calculation portion 943a sets Q1duty to 100% and Q2duty to 0%. As a result, the switching of Q1 and Q2 is stopped continuously in the forward mode when the absolute value |vac| is between the threshold voltage vb×k and the reference voltage Vref. The first control portion 940 sets a stop period TDS3 in a period during which the AC voltage vac is below the threshold voltage vb×k. The first control portion 940 sets the stop period TDS3 in a period during which the AC voltage vac is above the reference voltage Vref (|vac|>Vref). As a result, the first control portion 940 defines a period (1) during which the AC voltage vac is below the threshold voltage vb×k (|vac|≤vb×k) and the AC voltage vac is above the reference voltage Vref (|vac|>Vref) as the stop period TDS3.

(2-1) First Switching Mode

When |vac|>vb×k, the calculation portion 943a sets Q1duty to (vb×k/|vac|) % and Q2duty to 0%. As a result, the step-down control is provided by Q1 and Q2 is held in a stop state (OFF state) continuously in the forward mode when the absolute value |vac| is above the threshold voltage vb×k. The first control portion 940 defines a period (2-1) during which the AC voltage vac is above the threshold voltage vb×k (|vac|>vb×k) as the first switching period TSW1. In the first switching period TSW1, the first control portion 940 performs the switching of Q1 and stops the switching of Q2. Because both Q1 and Q2 are not switched owing to this configuration, a step-wise fluctuation of the duty ratio caused by a dead time can be suppressed.

(2-2) Second Switching Mode

When |vac|≤Vref, the calculation portion 943a sets Q1duty according to the map 543b and Q2duty to (1−Q1duty) %. As a result, the duties of Q1 and Q2 are changed gradually in the vicinity of the zero crossing point of the AC voltage vac. The first control portion 940 defines a period (2-2) during which the AC voltage vac is below the reference voltage Vref (|vac|<Vref) as the second switching period TSW2.

The control device 509 includes an output portion (OPSM) 944. The output portion 944 provides the pulse width modulation portion 44 in the preceding embodiments. The output portion 944 outputs the drive signals of Q1 and Q2. The output portion 944 includes a PWM processing portion (PWM) 944a that applies pulse width modulation to the duty ratios Q1duty and Q2duty, which are command values, and a dead time processing portion (DETM) 944b that gives a dead time Vd to pulse signals outputted from the PWM processing portion 944a. The dead time Vd is a time given to avoid an event that Q1 and Q2 making a pair are driven to be in an ON state at the same time. A pulse width of the duty signal is cut when the dead time Vd is given. Hence, the output portion 944 outputs a pulse signal having an actual duty ratio that is smaller than the duty ratio specified by the calculation portion 943a by an amount comparable to the dead time Vd.

The first control portion 940 shown in the drawing provides a control portion for the forward mode. In the forward mode, the first control portion 940 directly connects the bridge circuit 6 and the converter circuit 7 when vb×k≥|vac|>Vref by closing Q1 and opening Q2. In the forward mode, the first control portion 940 controls Q1 to switch so that the step-down control is performed by Q1 and opens Q2 when |vac|>vb×k. In the forward mode, the first control portion 940 controls Q1 and Q2 to switch complementarily according to the absolute value |vac| independently of the DC voltage vb when |vac|≥Vref. Hence, the first control portion 940 performs the switching of at least one of Q1 and Q2 during the first and second switch periods TSW1 and TSW2.

The first control portion 940 can also provide a control portion for the reverse mode. The first control portion 940 controls Q1 and Q2 in the reverse mode as was described in the second embodiment above.

In the stop mode of the reverse mode, the calculation portion 943a sets Q1duty to 0% and Q2duty to 0%. As a result, the switching of Q1 and Q2 is stopped continuously in the reverse mode when the absolute value |vac| is between the threshold voltage vb×k and the reference voltage Vref (vb×k≥|vac|>Vref).

In the first switching mode of the revere mode, the calculation portion 943a sets Q2duty to (vb×k/|vac|) % and Q1duty to 0%. As a result, when the absolute value |vac| is above the threshold voltage vb×k (|vac|>vb×k) in the reverse mode, the step-up control is provided by Q2 and Q1 is held in a stop state (OFF state) continuously.

In the second switching mode of the reverse mode, the calculation portion 943a sets Q1duty according to the map 543b and Q2duty to (1−Q1duty) %. As a result, the duty ratios of Q1 and Q2 are changed gradually in the vicinity of a zero crossing point (|vac|≤Vref) of the AC voltage vac. Hence, in the reverse mode, too, Q1 and Q2 are controlled to switch complementarily in the vicinity of a zero crossing point according to the absolute value |vac| and independently of the DC voltage vb.

In this embodiment, too, the control device 509 includes the second control portion 50 used to control Q3 and Q4. In the forward mode, the step-up control is provided as the Q4 is controlled to switch while Q3 is held in a stop state continuously. In the reverse mode, the step-down control is provided as Q3 is controlled to switch while Q4 is held in a stop state continuously. Hence, the second control portion 50 controls at least one of Q3 and Q4 to always switch during all the stop period TDS3, the first switching period TSW1, and the second switching period TSW2.

Figure 20:
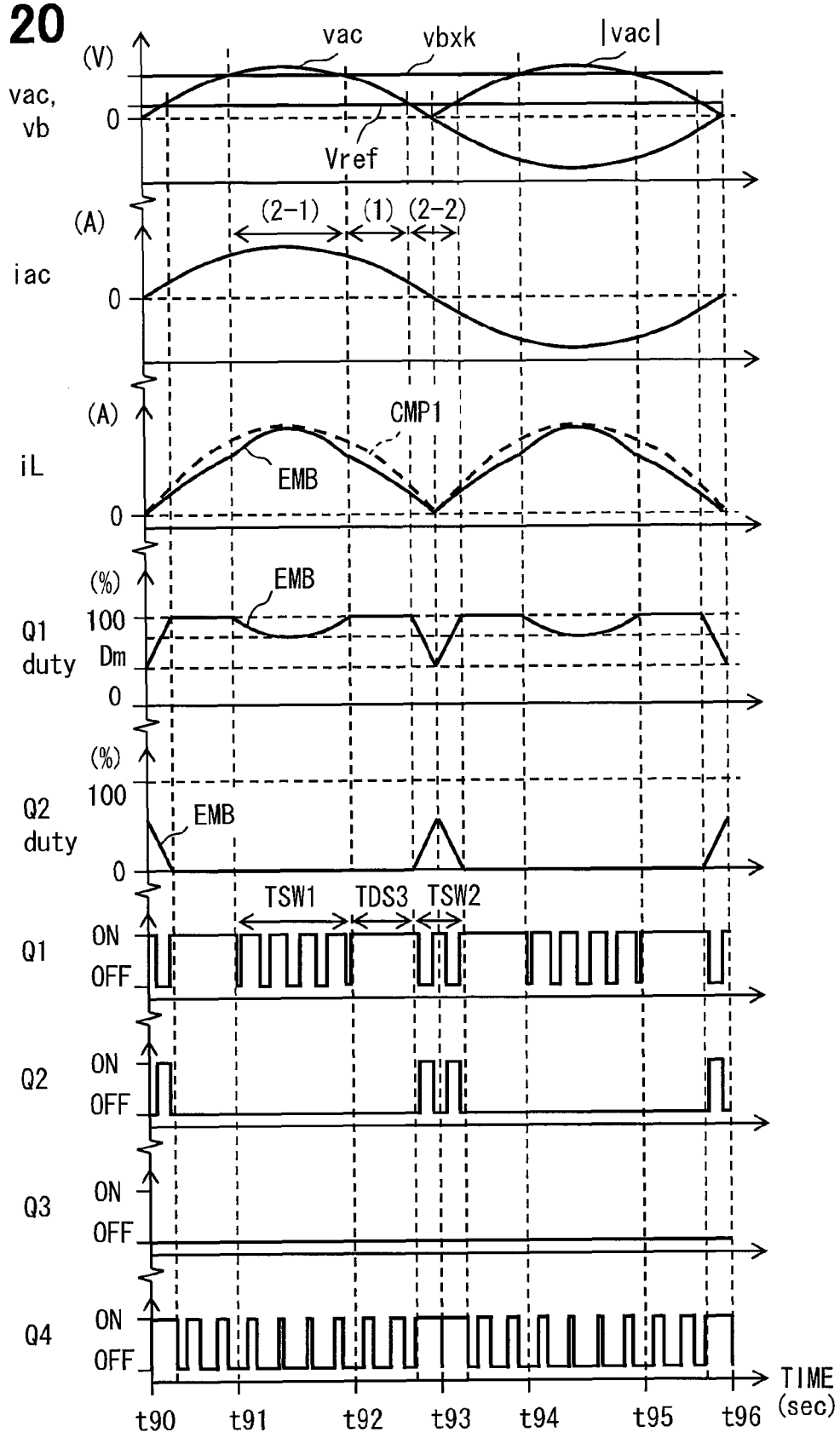
FIG. 20 is a timing chart showing an example of an operation of the ninth embodiment.

FIG. 20 shows an operation state of the power conversion apparatus 2 in the forward mode. The drawing shows Q1duty and Q2duty. As is shown in the drawing, the switching of Q1 and Q2 is stopped during the period (1) corresponding to the stop mode. Further, the switching of Q3 is stopped during the period (1). The period (1) corresponds to the stop period TDS3. In the stop state, the switch element is maintained fixedly in an ON state or an OFF state without depending on a variance of the AC voltage vac.

During the period (2-1) corresponding to the first switching mode, Q1 and Q4 are switched. The period (2-1) provides the first switching period TSW1. The first switching period TSW1 is a period during which at least one of Q1 and Q2 located on the side of the AC end 2a is controlled to switch for a step-up or step-down operation when the absolute value |vac| is above the threshold voltage vb×k. During the period (2-2) corresponding to the second switching mode, Q1 and Q2 are switched. The period (2-2) provides the second switching period TSW2. The second switching period TSW2 is a period during which at least one of Q1 and Q2 located on the side of the AC end 2a is controlled to switch so as to use the bootstrap circuit when the absolute value |vac| is below the reference voltage Vref.

According to this embodiment, Q1 and Q2 do not perform a switching operation during the period (1). Hence, in comparison with a comparative example in which Q1 and Q2 are driven at a constant or invariable duty, the number of switching times of Q1 and Q2 can be suppressed. Switching losses at Q1 and Q2 can be thus reduced.

In the period (2-1), Q1duty varies sinusoidally. Hence, in comparison with a comparative example in which Q1duty is fixed to a constant value, Q1duty can be increased. In other words, a period during which Q1duty takes a large value can be longer. As a result, the reactor current can be smaller. The reactor current iL is given as: iL=|iac|/Q1duty. A period during which the reactor current iL is small becomes longer as the period during which Q1duty takes a large value becomes longer. Accordingly, a conduction loss and an iron loss occurring in the reactor 19 can be reduced. Further, because the reactor current iL becomes smaller, a current flowing to Q1 through Q4 is suppressed. Hence, switching losses and conduction losses can be reduced at Q1 through Q4, too.

In the period (2-2), Q1 and Q2 perform a switching operation complimentarily to charge the bootstrap capacitor for Q1. However, because the period (2-2) is in the vicinity of the zero crossing point, the AC voltage vac and the AC current iac are small. Hence, losses are small even when Q1 and Q2 perform the switching operation. Accordingly, influences given to efficiency of the power conversion apparatus 2 are negligible.

Figure 21:
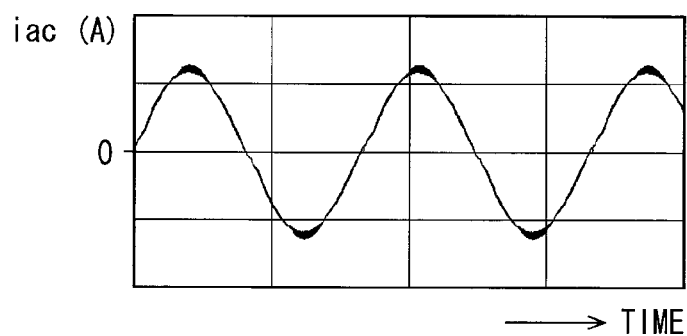
FIG. 21 is a waveform chart showing the example of the operation of the ninth embodiment.

FIG. 21 shows the AC current iac also called an input current of the power conversion apparatus 2 in the forward mode. The drawing shows an example of an operation to output 3 kW when the AC voltage vac of the AC power supply 3 is 240 Vac and the DC output voltage across the DC end 2b is 300 V. A smooth sinusoidal waveform as is shown in the drawing can be obtained. Hence, a harmonic current in the AC current iac can be suppressed.

In this embodiment, the control of Q1 and Q2 during the period (2-1) contributes to suppression of harmonics. During the period (2-1), only one of Q1 and Q2 is controlled to switch and the other is maintained fixedly in an OFF state. Because only one of Q1 and Q2 making a pair is switched, a need to provide a dead time is eliminated. In other words, an inconvenience that the pulse width is cut by providing a dead time does not occur. Hence, a step-wise fluctuation of the duty ratio caused by providing a dead time can be avoided. As a result, a transitional change of a waveform of a current or the like can be suppressed and harmonic components can be suppressed.

Figure 22:
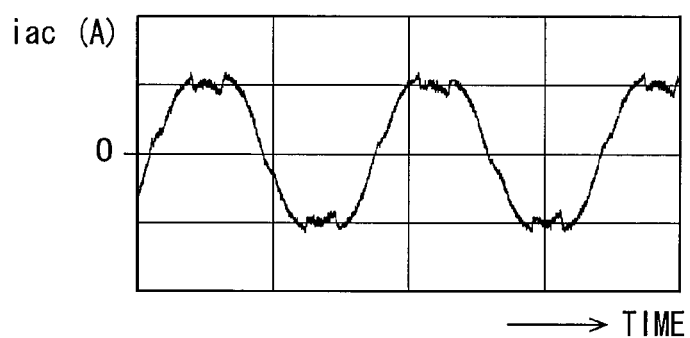
FIG. 22 is a waveform chart showing an example of an operation of a comparative example.

FIG. 22 shows the AC current iac in a comparative example in which the duty ratio fluctuates step-wise. A waveform shown in the drawing has large distortions in periods during which the AC current iac is relatively large. Hence, many harmonic components are superimposed on the AC current iac. Such an AC current iac may possibly provide adverse influences to the power supply quality of the AC power supply 3.

Figure 23:
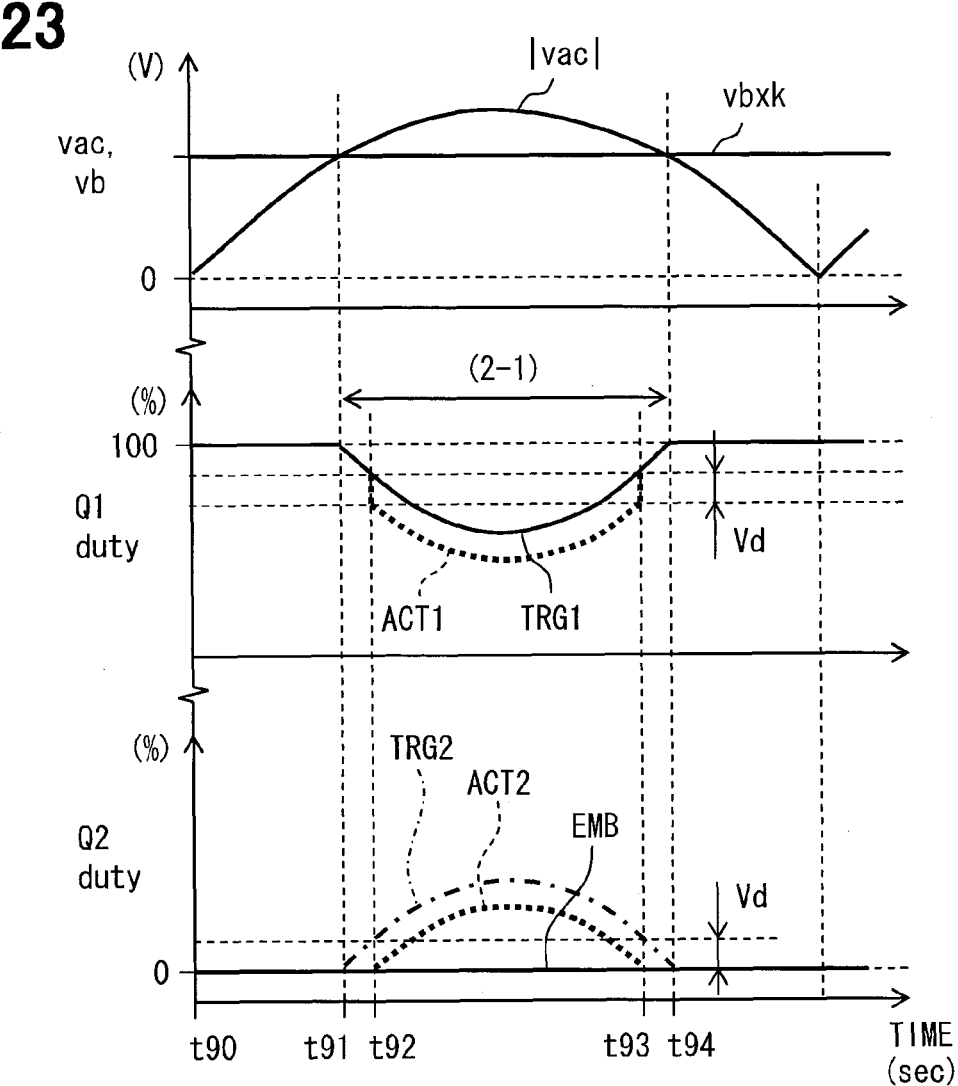
FIG. 23 is a timing chart showing an example of the operation of the comparative example.

FIG. 23 shows an example of an operation in the comparative example used to describe a step-wise fluctuation of the duty ratio caused by a dead time. In the example shown in the drawing, the absolute value |vac| is above the threshold voltage vb×k during the period (2-1) from the times t91 to t94. In a case where Q1 and Q2 are switched complimentarily to provide the step-up control or the step-down control, Q1duty and Q2duty as command values are adjusted so as to vary symmetrically. For example, as is indicated by a solid line TRG1, Q1duty starts to decrease from the time t91 and returns to 0 at the time t94. As is indicated by an alternate long and short dash line TRG2, Q2duty starts to increase from the time t91 and returns to 0 at the time t94.

An actual value of the duty ratio of a pulse signal actually given to the switch element does not coincide exactly with the command value. The reason for this discrepancy is that the dead time Vd is given by cutting the pulse width set according to the command value, that is, by correcting an ON period to be shorter. Moreover, when the command value is below the dead time Vd, the pulse width cannot be cut. In other words, in a case where the pulse width given by the command value is below a time width of the dead time Vd, the pulse signal is not outputted regardless of the presence of the command value because the command value is masked by the dead time Vd.

In the example shown in the drawing, the command value TRG2 is masked by the dead time Vd between the time t91 and the time t92 and between the time t93 and the time t94. After the time t91, the command value TRG1 starts to decrease gradually from 100%. An actual value ACT1 decreases gradually with a variance of the command value TRG1. On the other hand, the command value TRG2 starts to increase gradually from 0% after the time t91. In this instance, because the command value TRG2 is masked by the dead time Vd, an actual value ACT2 of the duty ratio of a pulse signal to be given to Q2 starts to increase with a delay. The actual value ACT2 starts to increase gradually from the time t92. In other words, a pulse signal to be given to Q2 appears at the time t92. When the pulse signal to be given to Q2 appears at the time t92, the dead time Vd is cut at the same time from the pulse signal to be given to Q1. In this instance, the actual value ACT1 varies step-wise. A step-wise fluctuation occurs in the actual value ACT1 also at the time t93. A step-wise fluctuation of the duty ratio gives a discontinuous variance to a voltage and a current. Hence, harmonic components in the waveform of a current or the like increase.

In the ninth embodiment, Q2duty is fixed to 0% during the period (2-1). The actual value given to Q1 therefore coincides with the command value TRG1 excluding the dead time Vd.

Hence, a collector-emitter voltage VCE of Q1 varies sinusoidally. Harmonic components can be thus suppressed.

Tenth Embodiment

Figure 24:
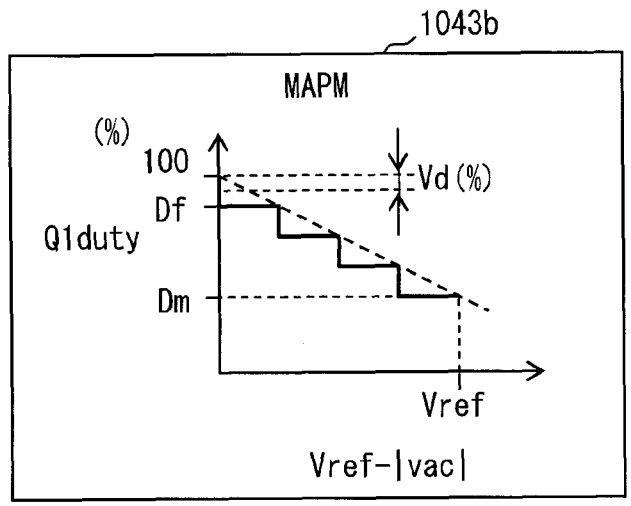
FIG. 24 is a block diagram showing a part of a control device according to a tenth embodiment.

This embodiment is a modification based on the preceding embodiments as to the fundamental configuration. In the map 943b of FIG. 19, Q1duty as the command value continues to decrease gradually from 100%. In this instance, Q2duty as the command value continues to increase gradually from 0%. Hence, a step-wise fluctuation of the duty ratio caused by the dead time Vd as described above may possibly occur also in the period (2-2). In the period (2-2), because both the AC voltage vac and the AC current iac are small, an increase of the harmonic components is small. Nevertheless, fewer harmonic components are desirable. In this embodiment, a map 1043b shown in FIG. 24 is adopted instead of the map 943b to suppress the harmonic components.

The map 1043b is set in such a manner that a variation Df exceeding the dead time Vd is given to the command value at a border between a region in which Q1duty (command value) is changed from 100% and a region in which Q1duty (command value) is changed toward 100%. The map 1043b is set in such a manner that the command value varies in a range below 100−Vd. The map 1043b is set in such a manner that the command value increases or decreases gradually from an initial value Df set so as to exceed a variation of the duty ratio caused by the dead time Vd. To confer this feature, the map 1043b sets the command value with a discrete feature. A variation width Df of the command value by the map 1043b is set so as to exceed the dead time Vd.

The first control portion 940 adopting the map 1043b adjusts the duty ratios of Q1 and Q2 within a range in which an ON period longer than the dead time Vd is given when both Q1 and Q2 are switched. In other words, the duty ratios, which are the command values for Q1 and Q2, are adjusted within a range in which actual ON periods to be given to Q1 and Q2 do not disappear even when the ON periods defined by the duty ratios, which are the command values, are cut by the dead time Vd.

According to the map 1043b, the variation Df exceeding the dead time Vd is given to Q2duty set complimentarily with Q1duty at the border between a region in which Q2duty is changed from 0% and a region in which Q2duty is changed toward 0%. Hence, an inconvenience that Q2duty, which is the command value, is masked by the dead time Vd can be avoided. Distortions of the waveform of a current or the like can be thus suppressed.

Other Embodiments

For example, means and functions provided by the control device can be provided by either software or hardware alone, or a combination thereof. For example, the control device may be formed of an analog circuit. Alternatively, the control device may be provided by a programmable integrated circuit called an FPGA (Field Programmable Gate Array) or a CPLD (Complex Programmable Logic Device).

In the embodiments above, the reactor current iL flowing to the reactor 19 is detected and fed back. However, the power factor correction control may be performed by feeding back the AC current iac instead.

In the embodiments above, the disclosure is applied to the two-way power conversion apparatus 2 capable of providing the forward mode and the reverse mode. Alternatively, the disclosure may be applied to a one-way power conversion apparatus 2 that provides either the forward mode or the reverse mode alone.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A power conversion apparatus comprising:
    a bridge circuit disposed between an AC end, to which an AC power supply is connected, and a DC end, to which a DC power supply is connected;
    a converter circuit disposed between the bridge circuit and the DC end; and
    a control device that controls the converter circuit, wherein:
    the converter circuit includes:
        a first switch element and a second switch element arranged in series between terminals of the bridge circuit;
        a third switch element and a fourth switch element arranged in series between terminals of the DC end; and
        a reactor arranged between an intermediate point of the first and second switch elements and an intermediate point of the third and fourth switch elements;
    the control device includes:
        a first control portion that defines a part of a cycle of an AC voltage across the AC end as a stop period and stops switching the first switch element and the second switch element during the stop period; and
        a second control portion that performs voltage control and power factor correction control over an entire cycle of the AC voltage by switching at least one of the third switch element and the fourth switch element, wherein:
    the first control portion sets the stop period in a period, during which the AC voltage falls below a threshold voltage;
    the threshold is set by a DC voltage across the DC end and a coefficient less than 1;
    the first control portion defines a period, during which the AC voltage exceeds the threshold voltage, as a switching period; and
    the first control portion performs switching at least one of the first switch element and the second switch element during the switching period.

2. The power conversion apparatus according to claim 1, wherein:
    the first control portion fixes the first switch element in an ON state and the second switch element in an OFF state during the stop period.

3. The power conversion apparatus according to claim 1, wherein:
    the second control portion always performs switching at least one of the third switch element and the fourth switch element.

4. The power conversion apparatus according to claim 1, wherein:
    the first control portion adjusts a duty ratio of the first switch element and a duty ratio of the second switch element within a range, in which an ON period is longer than a dead time when the first control portion performs switching both of the first switch element and the second switch element.

5. The power conversion apparatus according to claim 1, wherein:
the coefficient is equal to or larger than 0.95 and smaller than 1.0.

6. The power conversion apparatus according to claim 1, wherein:
the first control portion fixes the first switch element in an ON state and the second switch element in an OFF state during the stop period when power is supplied from the AC end to the DC end.

7. The power conversion apparatus according to claim 1, wherein:
the first control portion fixes the first switch element in an OFF state and the second switch element in an OFF state during the stop period when power is supplied from the DC end to the AC end.

8. The power conversion apparatus according to claim 1, wherein:
the first control portion performs switching at least one of the first switch element and the second switch element during the switching period with a duty ratio that varies sinusoidally during the switching period.

9. The power conversion apparatus according to claim 1, wherein:
the first control portion performs switching at least one of the first switch element and the second switch element during the switching period with a duty ratio that varies trapezoidally during the switching period.

10. The power conversion apparatus according to claim 1, wherein:
the first control portion performs switching at least one of the first switch element and the second switch element during the switching period.

11. The power conversion apparatus according to claim 10, wherein:
the first control portion performs switching the first switch element and stops switching the second switch element during the switching period.

12. A power conversion apparatus comprising:
a bridge circuit disposed between an AC end, to which an AC power supply is connected, and a DC end, to which a DC power supply is connected;
a converter circuit disposed between the bridge circuit and the DC end; and
a control device that controls the converter circuit, wherein:
the converter circuit includes:
a first switch element and a second switch element arranged in series between terminals of the bridge circuit;
a third switch element and a fourth switch element arranged in series between terminals of the DC end; and
a reactor arranged between an intermediate point of the first and second switch elements and an intermediate point of the third and fourth switch elements;
the control device includes:
a first control portion that defines a part of a cycle of an AC voltage across the AC end as a stop period and stops switching the first switch element and the second switch element during the stop period; and
a second control portion that performs voltage control and power factor correction control over an entire cycle of the AC voltage by switching at least one of the third switch element and the fourth switch element;
wherein:
the first switch element is a high-side switch;
the second switch element is a low-side switch;
the control device includes a bootstrap circuit having a capacitor, which is charged when the second switch element is in an ON state;
the bootstrap circuit supplies a charge stored in the capacitor to a control terminal of the first switch element when the first switch element is controlled to be in an ON state;
the first control portion sets the stop period in a period, during which the AC voltage exceeds a predetermined reference voltage;
the first control portion defines a period, during which the AC voltage falls below the reference voltage, as a switching period; and
the first control portion performs switching at least one of the first switch element and the second switch element during the switching period.

13. The power conversion apparatus according to claim 12, wherein:
the first control portion defines a period, during which a maximum value of the AC voltage falls below a DC voltage across the DC end, and the AC voltage exceeds the predetermined reference voltage, as the stop period;
the first control portion defines a period, during which the maximum value falls below the DC voltage, and the AC voltage falls below the reference voltage, as the switching period.

14. The power conversion apparatus according to claim 12, wherein:
the first control portion defines a period, during which the AC voltage falls below a threshold voltage, and the AC voltage exceeds a predetermined reference voltage, as the stop period;
the threshold voltage is set by a DC voltage across the DC end and a coefficient less than 1;
the first control portion defines a period, during which the AC voltage exceeds the threshold voltage, as a first switching period;
the first control portion defines a period, during which the AC voltage falls below the reference voltage, as a second switching period; and
the first control portion performs switching at least one of the first switch element and the second switch element during the first and second switching periods.

15. The power conversion apparatus according to claim 12, wherein:
the first control portion performs switching the first switch element during the switching period with a duty ratio that varies so as to be a minimal value when a polarity of the AC voltage is reversed.

16. The power conversion apparatus according to claim 15, wherein:
the first control portion changes the duty ratio gradually.

17. The power conversion apparatus according to claim 12, wherein:
the reference voltage is set to a value less than a half of a maximum value of the AC voltage.

18. A power conversion apparatus comprising:
a bridge circuit disposed between an AC end, to which an AC power supply is connected, and a DC end, to which a DC power supply is connected;
a converter circuit disposed between the bridge circuit and the DC end, the converter circuit including:

a first switch element and a second switch element arranged in series between terminals of the bridge circuit;

a third switch element and a fourth switch element arranged in series between terminals of the DC end; and a reactor arranged between an intermediate point of the first and second switch elements and an intermediate point of the third and fourth switch elements; and a controller for controlling the converter circuit, the controller being configured to:

define a part of a cycle of an AC voltage across the AC end as a stop period and stops switching the first switch element and the second switch element during the stop period; and perform voltage control and power factor correction control over an entire cycle of the AC voltage by switching at least one of the third switch element and the fourth switch element, and wherein:

the controller is further configured to set the stop period in a period, during which the AC voltage falls below a threshold voltage;

the threshold is set by a DC voltage across the DC end and a coefficient less than 1;

the controller is further configured to define a period, during which the AC voltage exceeds the threshold voltage, as a switching period; and the controller is further configured to perform switching at least one of the first switch element and the second switch element during the switching period.

* * * * *